(12) United States Patent
Kawakami et al.

(10) Patent No.: US 6,421,091 B1
(45) Date of Patent: Jul. 16, 2002

(54) DATA TRANSMISSION APPARATUS FOR TRANSMITTING DIGITAL VIDEO AND AUDIO DATA BETWEEN RESPECTIVE AUDIO VISUAL APPARATUSES, AND METHOD THEREFOR

(75) Inventors: Yasunori Kawakami; Tatsuro Juri, both of Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 08/995,525

(22) Filed: Dec. 22, 1997

Related U.S. Application Data

(62) Division of application No. 08/884,394, filed on Jun. 27, 1997, which is a continuation of application No. 08/272,413, filed on Jul. 7, 1994, now abandoned.

(30) Foreign Application Priority Data

| Jul. 8, 1993 | (JP) | ............................................. 5-168902 |
| Jul. 19, 1993 | (JP) | ............................................. 5-177799 |
| Aug. 24, 1993 | (JP) | ............................................. 5-209347 |

(51) Int. Cl.⁷ ............................ H04N 3/20; H04N 9/00; H04N 11/00
(52) U.S. Cl. ........................ 348/473; 348/441; 348/458; 386/108; 386/1
(58) Field of Search ................................ 348/473, 458, 348/459, 554–558; 386/1, 45, 113, 95, 98, 79, 125, 126, 111, 112; H04N 7/08, 7/084, 7/087, 7/01, 11/20, 9/00, 9/79, 5/91, 7/04, 7/06, 7/52

(56) References Cited

U.S. PATENT DOCUMENTS

| 4,277,807 A | * | 7/1981 | Baldwin | 386/49 |
| 4,353,098 A | | 10/1982 | Heinz et al. | 360/9.1 |
| 4,907,101 A | * | 3/1990 | Keesen et al. | 386/124 |
| 5,172,380 A | * | 12/1992 | Odaka | 714/755 |
| 5,396,374 A | * | 3/1995 | Kubota et al. | 386/79 |
| 5,400,186 A | * | 3/1995 | Inoue et al. | 386/100 |
| 5,479,299 A | * | 12/1995 | Matsumi et al. | 386/54 |

FOREIGN PATENT DOCUMENTS

| EP | 0 276 753 | 8/1988 |
| EP | 0 303 450 | 2/1989 |
| EP | 0 501 699 | 9/1992 |
| EP | 0 521 487 | 1/1993 |

\* cited by examiner

*Primary Examiner*—Vivek Srivastava
(74) *Attorney, Agent, or Firm*—McDermott, Will & Emery

(57) ABSTRACT

In a data transmission apparatus for transmitting digital video and audio data, a block forming circuit forms a plurality of data blocks of transmission data composed of at least one of digital video data, digital audio data, and digital auxiliary data related to the digital video data and the digital audio data. Thereafter, a grouping circuit groups a plurality of data blocks outputted from the block forming circuit so as to form transmission group data of one transmission unit block having a time length of approximately one three-hundredth second, and then transmits the transmission group data. Further, a classifying circuit preferably classifies the transmission group data into a plurality of sections, by adding section identification data to each transmission group data.

6 Claims, 19 Drawing Sheets

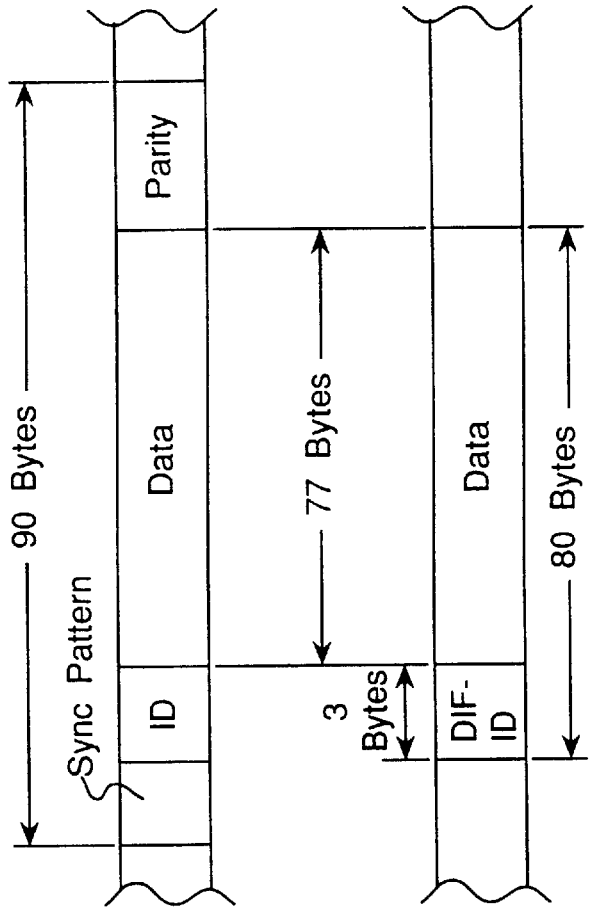
Fig. 11A  Video and Audio Data to be recorded onto Tape and to be reproduced form Tape
Sync Block Structure
Fig. 11B  Video and Audio Data outputted form Block Forming Circuits 1004 and 1005
DIF Block Structure

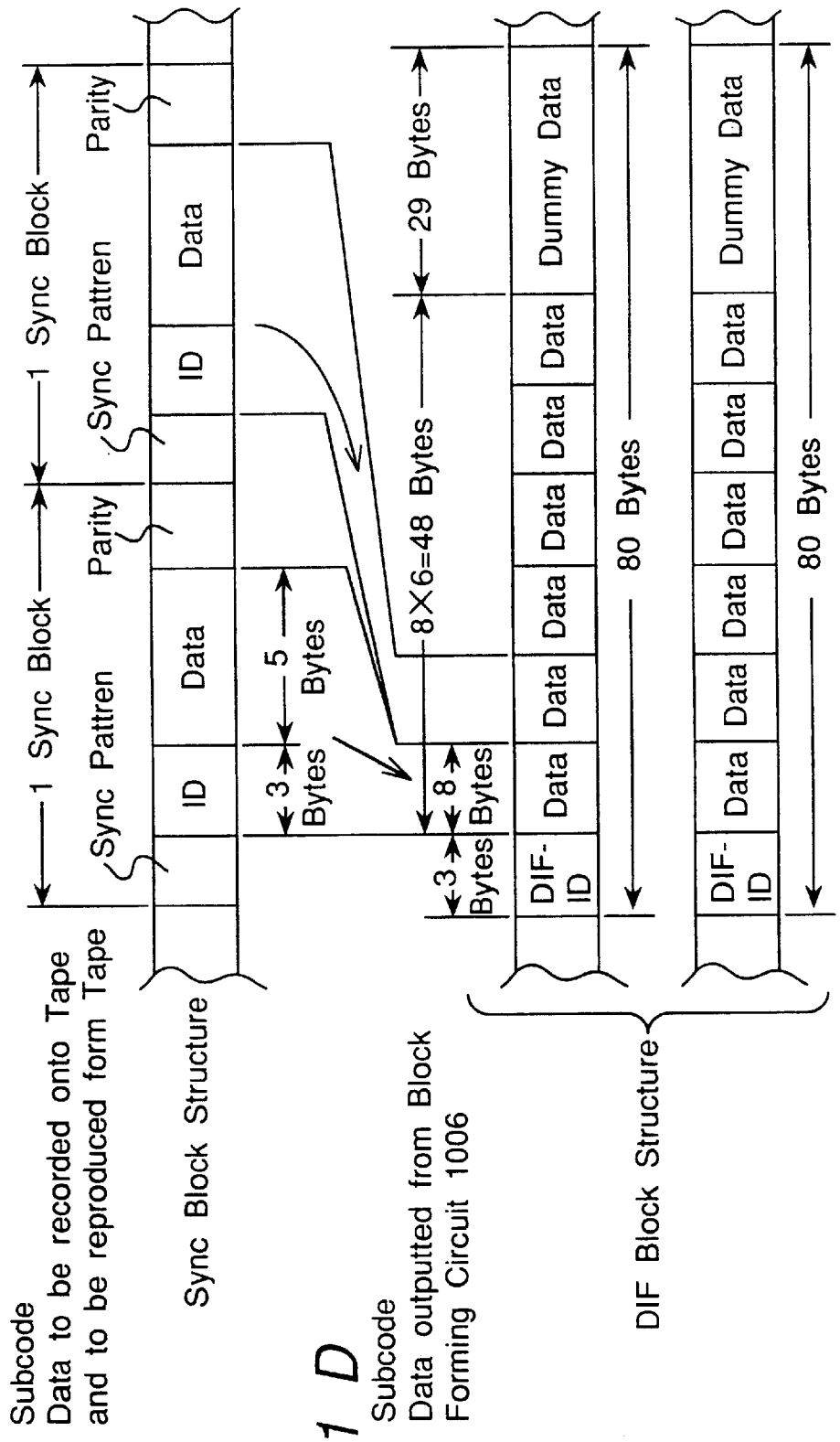

Fig. 17    PACK Correction Circuit 902

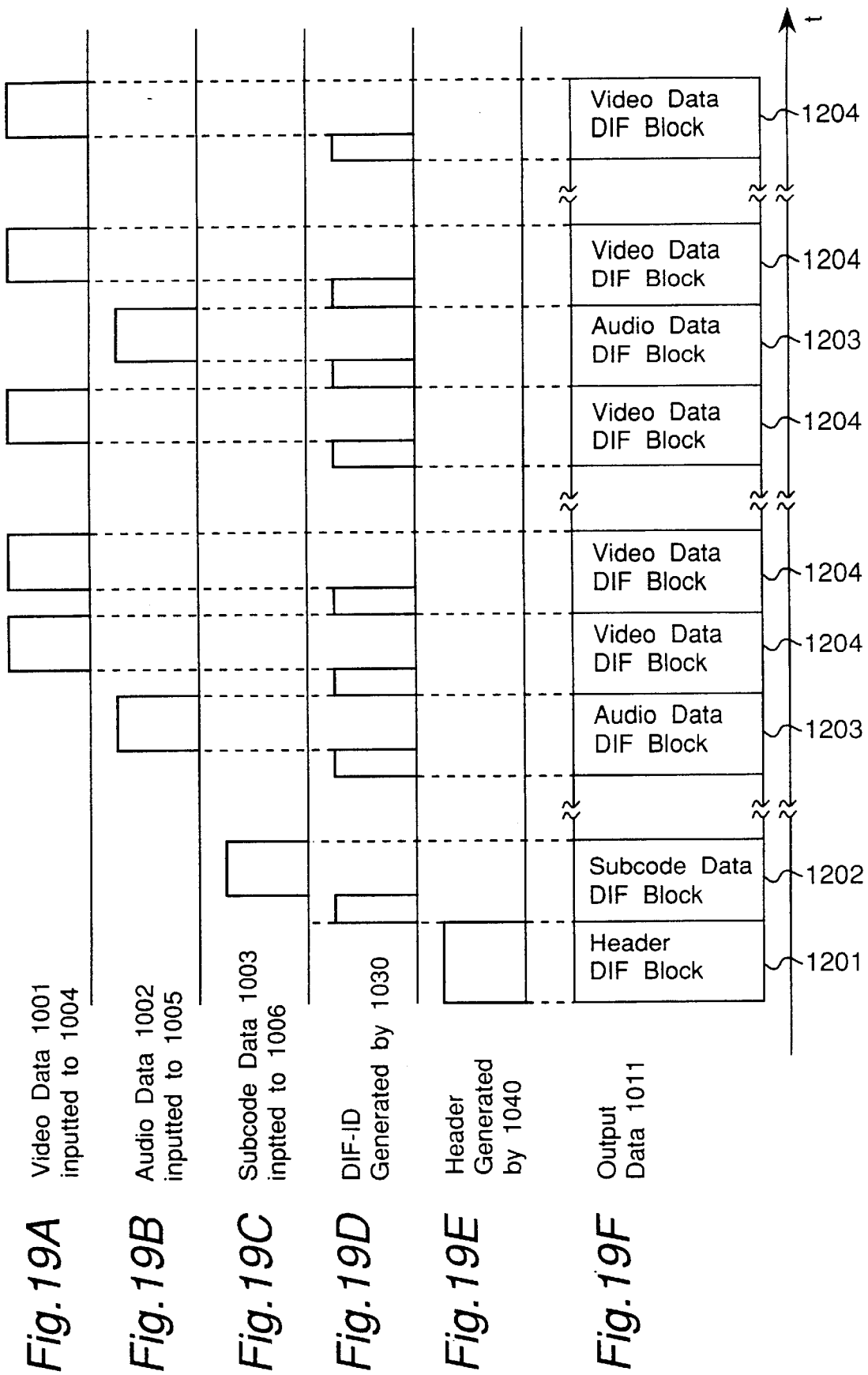

DATA TRANSMISSION APPARATUS FOR TRANSMITTING DIGITAL VIDEO AND AUDIO DATA BETWEEN RESPECTIVE AUDIO VISUAL APPARATUSES, AND METHOD THEREFOR

This is a Divisional of U.S. patent application Ser. No. 08/884,394, filed Jun. 27, 1997, which is a File Wrapper Continuation of U.S. patent application Ser. No. 08/272,413, filed Jul. 7, 1994, now abandoned.

BACKGROUND OF THE INVENTION

1. Field of the Invention

The present invention relates to a data transmission apparatus and a method for transmitting data, and in particular, to a data transmission apparatus for transmitting digital video and audio data between respective audio visual apparatuses, such as a digital video cassette recorder (referred to as a digital VCR) or the like, and a method therefor.

2. Description of the Related Art

There has been currently under development of digital VCRs for recording video and audio in a form of digital signals expressed by 0s and 1s, respectively, for the purpose of achieving high-quality video and audio. One of major features of the digital VCRs is that the qualities of video and audio signals are not deteriorated through dubbing these signals. In the digital VCR, an audio signal, a video signal and the other control signal or the like are recorded in a form of digital signals on a magnetic tape, respectively.

Since transmission of data is executed in a form of a digital signal between the digital VCRs, the transmitted data does not change in the transmission stage. Therefore, the recorded data can be transmitted as it is from an audio visual apparatus to another audio visual apparatus.

In particular, in a digital VCR for consumer use, the video signal is recorded onto the magnetic tape in a form of a compressed video signal so that the amount of data to be recorded thereonto can be reduced for the purpose of reducing the amount of consumption of the magnetic tape. In order to transmit a video signal reproduced by a digital VCR therefrom to another digital VCR in a form of an analog signal and to record the transmitted video signal in the latter VCR, the reproduced video signal is decompressed so as to be converted into an analog video signal. The analog video signal is inputted to the digital VCR in which the video signal is to be recorded. In the digital VCR, the analog video signal is converted into a digital video signal so as to be compressed again. Through the above-mentioned compression and decompression processes, the quality of the image of the video signal may deteriorate.

In the case when transmitting the video signal in a form of a compressed digital signal, there is a great advantageous effect of causing no deterioration of the quality of the image thereof due to the transmission process because the compression and decompression processes are not required.

For the digital VCR is defined a digital interface for transmitting video and audio signals in a form of digital signals. In the digital VCR, one track is segmented into a plurality of sectors, and then a subcode for the video and audio signals, time code, and the like are recorded in respective sectors. In a general digital interface, data to be recorded in the sectors are transmitted in a predetermined order.

The first problem to be solved by the present invention is as follows. When one field is a transmission unit, the period of one field is greatly different between the television broadcasting system having a frame frequency of 25 Hz such as SECAM system, PAL system or the like and another television broadcasting system having a frame frequency of 30 Hz such as NTSC system. Therefore, a time interval required for transmitting one transmission unit is greatly different depending on the television broadcasting system.

When transmitting data of a plurality of television broadcasting systems by means of an identical transmission medium between a plurality of audio visual apparatuses such as digital VCRs or the like, there is such a problem that the time interval for transmitting one transmission data unit is required to cope with a plurality of types of the transmission time.

The second problem to be solved by the present invention is as follows. In the case of implementing a digital VCR for consumer use, it may be required to transmit video and audio signals of both of the high-definition television (HDTV) broadcasting system such as High-Vision system or the like and the current television broadcasting system such as NTSC system or the like between a plurality of digital VCRs or the like. In order to achieve cost reduction, it is required to provide an identical transmission path line in both of the case where the signals of the current television broadcasting system are transmitted and the case where the signals of the high-definition television broadcasting system are transmitted. However, the amount of information of the video signal of the high-definition television broadcasting system is much greater than that of the current television broadcasting system. Since the amount of data is greatly different between the signals of the high-definition television broadcasting system and the signals of the current television broadcasting system, there is such a problem that data of the signals of the current television broadcasting system and the data of the signals of the high-definition television broadcasting system are compelled to be transmitted in different manners.

The third problem to be solved by the present invention is as follows. Since any conventional digital VTR copes with only the standard television signal such as an NTSC television signal, a SECAM television signal, a PAL television signal or the like, then the other type of inputted signal cannot be recorded in the conventional digital VTR. On the other hand, in order to increase the number of types of signals which can be inputted and recorded onto a magnetic tape, there has been suggested a method of changing either the number of sectors or the structure of sectors in each track. In this case, not only a track structure flag representing the number, arrangement and the like of sectors in a track, but also a sector structure flag representing, for each sector represented by the track structure flag, the structure of the sector are to be recorded within the track on the magnetic tape.

However, the conventional digital interface has such a problem that it cannot cope with the change of such track structure as described above since it communicates with other apparatuses always in a previously fixed format. Furthermore, since all the data including the other sectors are required to be transmitted even in the case where the data of a specified sector is desired to be transmitted, there is such a problem that the excessive transmission band for unnecessary transmission must be provided.

The fourth problem to be solved by the present invention is as follows. In the digital VCR, other than the video and audio signals, not only VAUX (Video Auxiliary) data representing the type, kind or the like of the television broadcasting system of the video signal, but also AAUX (Audio Auxiliary) data representing the sampling frequency or the like of the audio signal are additionally recorded onto the magnetic tape. The above-mentioned these information data are very important data necessary in reproducing the recorded video and audio signals in the reproduction stage. Therefore, the information data are repetitively recorded a plural of times in one frame period of the video signal. In transmitting the video and audio signals from the digital VCR to another digital VCR, the VAUX and AAUX data corresponding to the video and audio signals must be additionally transmitted thereto. In general, the data are transmitted a plurality of times in one frame period in conformity with the recorded tracks.

However, in a bad reproducing condition, the probability of occurrence of the phenomenon becomes higher that an error correcting process is executed by an error correcting function, wherein the phenomenon is referred to as an "error correction" hereinafter). Since the error-corrected data does not allow its error to be detected any more, then the error data is transmitted as it is. When there is no error or when an error has occurred and then appropriately corrected, the identical VAUX and AAUX data are transmitted a plurality of times in one frame period, and therefore, the proper process is required to be executed in response to the received data on the receiver side.

However, when the error correction is performed, there is such a possibility that different VAUX and AAUX data or the like are transmitted in one frame period. In such a case, it is impossible to discriminate which VAUX and AAUX data are correct on the receiver side, and then this results in such a problem that the television broadcasting system can not be correctly selected, and the sampling frequency can not be correctly set.

SUMMARY OF THE INVENTION

In order to solve the above-mentioned problems, an essential object of the present invention is to provide a data transmission apparatus and a method capable of transmitting digital video and audio data of a plurality of television broadcasting systems, between a plurality of audio visual apparatuses such as digital VCRs.

Another object of the present invention is to provide a data transmission apparatus and a method capable of transmitting digital video and audio data of both of the high-definition television broadcasting system and the current television broadcasting system, between a plurality of audio visual apparatuses such as digital VCRs.

A further object of the present invention is to provide a data transmission apparatus and a method having a flexibility of data transmission, capable of transmitting a part or the whole part of various kinds of data with changing a data format thereof.

A still further object of the present invention is to provide a data transmission apparatus and a method capable of transmitting the identical additional data such as the VAUX data, the AAUX data or the like, together with digital video and audio data, by unifying the additional data in one frame According to one aspect of the present invention, there is provided a data transmission apparatus comprising:

block forming means for forming a plurality of data blocks of transmission data composed of at least one of digital video data, digital audio data, and digital auxiliary data related to said digital video data and said digital audio data, and outputting said plurality of data blocks; and grouping means for grouping said plurality of data blocks outputted from said block forming means so as to form transmission group data of one transmission unit block having a time length of approximately one three-hundredth second, and for transmitting said transmission group data.

Further, there is provided a method of transmitting data, including the steps of:

forming a plurality of data blocks of transmission data composed of at least one of digital video data, digital audio data, and digital auxiliary data related to said digital video data and said digital audio data, and outputting said plurality of data blocks;

grouping said plurality of data blocks so as to form transmission group data of one transmission unit block having a time length of approximately one three-hundredth second; and transmitting said transmission group data.

The present invention has such an advantageous effect as enabling transmission of the digital video and audio data of all the television broadcasting systems having frame frequencies of 25 Hz and 30 Hz by dealing with transmission executed approximately every one three-hundredth second.

The above-mentioned data transmission apparatus preferably further comprises classifying means for classifying said transmission group data into a plurality of sections, by adding section identification data to each said transmission group data.

The above-mentioned method preferably further includes a step of classifying said transmission group data into a plurality of sections, by adding section identification data to each said transmission group data.

The present invention produces such an advantageous effect of enabling transmission of the video and audio data of, for example, the high-definition television broadcasting system in a manner similar to that in the current broadcasting system by transmitting the digital video and audio data through classification thereof into a plurality of sections in such a case as the high-definition television broadcasting system having a great number of data blocks to be transmitted.

According to another aspect of the present invention, a data transmission apparatus for transmitting inputted digital data to be recorded in a plurality of sectors of each track on a recording medium, together with inputted first application ID data representing a structure of each said track and inputted second application ID data representing a structure of each of said sectors, comprising:

DIF-ID generating means for generating digital interface ID data including said inputted second application ID data, in response to said inputted second application ID data;

at least one block forming means for forming a data block including said digital data to be recorded and said digital interface ID data generated by said DIF-ID generating means, and outputting said data block;

header DIF block generating means for generating header digital interface block data including said inputted first application ID data; and grouping multiplexing means for time-multiplexing said header digital interface block data generated by said header DIF block generating means and said data block generated by said block forming means to form transmission digital data so that said data block follows said header digital interface block data, and transmitting said transmission digital data.

In the above-mentioned data transmission apparatus, said DIF-ID generating means preferably generates digital interface ID data including said inputted second application ID data and a transmission flag, in response to said inputted second application ID data and inputted transmission flag, said transmission flag representing whether or not data, to be recorded in a sector represented by said second application ID data which is in a track represented by said first application ID data within said header digital interface block data generated by said header DIF block generating means, is to be transmitted.

In the above-mentioned data transmission apparatus, said header DIF block generating means preferably generates header digital interface block data including application ID data representing that said first application ID data is indefinite, when said first application ID data is indefinite.

In the above-mentioned data transmission apparatus, said DIF-ID generating means preferably generates digital interface ID data including application ID data representing that said second application ID data is indefinite, when said second application ID data is indefinite.

The data transmission apparatus preferably further comprises:

memory means for storing said first and second application ID data;

wherein said DIF-ID generating means generates digital interface ID data including said second application ID data of the previous sector stored in said memory means, when there is no inputted second application ID data, and wherein said header DIF block generating means generates header digital interface block data including said first application ID data of the previous track stored in said memory means, when there is no inputted first application ID data.

According to a further aspect of the present invention, there is provided a method for transmitting inputted digital data to be recorded in a plurality of sectors of each track on a recording medium, together with inputted first application ID data representing a structure of each said track and inputted second application ID data representing a structure of each of said sectors, including the steps of:

generating digital interface ID data including said inputted second application ID data, in response to said inputted second application ID data;

forming a data block including said digital data to be recorded and said digital interface ID data generated in said generating digital interface ID data step, and outputting said data block;

generating header digital interface block data including said inputted first application ID data; and time-multiplexing said header digital interface block data generated in said generating header digital interface block data step and said data block generated in said forming step to form transmission digital data so that said data block follows said header digital interface block data, and transmitting said transmission digital data.

In the above-mentioned method, said generating digital interface ID data step preferably includes a step of generating digital interface ID data including said inputted second application ID data and a transmission flag, in response to said inputted second application ID data and inputted transmission flag, said transmission flag representing whether or not data, to be recorded in a sector represented by said second application ID data which is in a track represented by said first application ID data within said header digital interface block data generated in said generating header digital interface block data step, is to be transmitted.

In the above-mentioned method, said generating header digital interface block data step preferably includes a step of generating digital interface block data including application ID data representing that said first application ID data is indefinite, when said first application ID data is indefinite.

In the above-mentioned method, said generating digital interface ID data step preferably includes a step of generating digital interface ID data including application ID data representing that said second application ID data is indefinite, when said second application ID data is indefinite.

The above-mentioned method preferably further includes a step of:

storing said first and second application ID data in memory means;

wherein said generating digital interface ID data step includes a step of generating digital interface ID data including said second application ID data of the previous sector stored in said memory means, when there is no inputted second application ID data, and wherein said generating header digital interface block data step includes a step of generating header digital interface block data including said first application ID data of the previous track stored in said memory means, when there is no inputted first application ID data.

With the above-mentioned arrangement, therefore, by receiving the header digital interface (DIF) block data, the structure such as a format of the data block subsequent to the header DIF block can be identified. Therefore, according to the present invention, for example, no matter how the recording format changes, the digital interface format can be changed into a format appropriate for the recording format.

According to a still further aspect of the present invention, there is provided a data transmission apparatus for transmitting inputted digital video data and digital audio data together with inputted digital auxiliary data related to said digital video data and said digital audio data, said digital auxiliary data being transmitted a plurality of times in one frame, comprising:

at least one data extracting means for extracting said inputted digital auxiliary data from input data including said digital video data, said digital audio data and said digital auxiliary data;

at least one majority means for counting the respective numbers of the digital auxiliary data having the same contents among a plurality of inputted digital auxiliary data, and selecting and outputting the auxiliary data of the greatest counted number in one frame;

delay means for delaying said input data including said digital video data, said digital audio data and said digital auxiliary data by a time interval of one frame, and outputting said input data; and switching means for switching said input data outputted from said delay means and said auxiliary data of the greatest counted number in one frame outputted from said majority means, so as to output and transmit said digital video data, said digital audio data and said digital auxiliary data, together with said auxiliary data of the greatest counted number in one frame outputted from said majority means, by replacing said auxiliary data included in said input data, with said auxiliary data of the greatest counted number in one frame outputted from said majority means.

In the above-mentioned data transmission apparatus, said majority means preferably counts the respective numbers of the digital auxiliary data having the same contents related to said audio data, every channel of said audio data, among a plurality of inputted digital auxiliary data related to said audio data, and selects and outputs the auxiliary data of the greatest counted number in one frame which is related to said audio data.

According to a still more further aspect of the present invention, there is provided a method for transmitting inputted digital video data and digital audio data together with inputted digital auxiliary data related to said digital video data and said digital audio data, said digital auxiliary data being transmitted a plurality of times in one frame, including:

extracting said inputted digital auxiliary data from input data including said digital video data, said digital audio data and said digital auxiliary data;

counting the respective numbers of the digital auxiliary data having the same contents among a plurality of inputted digital auxiliary data, and selecting and outputting the auxiliary data of the greatest counted number in one frame;

delaying said input data including said digital video data, said digital audio data and said digital auxiliary data by a time interval of one frame, and outputting said input data; and switching said delayed input data and said outputted auxiliary data of the greatest counted number in one frame, so as to output and transmit said digital video data, said digital audio data and said digital auxiliary data, together with said outputted auxiliary data of the greatest counted number in one frame, by replacing said auxiliary data included in said input data, with said outputted auxiliary data of the greatest counted number in one frame.

In the above-mentioned method, said counting step preferably includes a step of counting the respective numbers of the digital auxiliary data having the same contents related to said audio data, every channel of said audio data, among a plurality of inputted digital auxiliary data related to said audio data, and selecting and outputting the auxiliary data of the greatest counted number in one frame which is related to said audio data.

According to the present invention, in regard to important auxiliary data which have identical contents and recorded a plurality of times in one frame on a recording medium such as magnetic tape, when auxiliary data having different contents are reproduced within one frame due to reproduction error or the like, the auxiliary data are transmitted with their contents unified to the contents presumed to be most accurate. With the above-mentioned arrangement, the auxiliary data having identical contents can be obtained on the receiver side, for example, thereby allowing a digital VCR to be set based on the auxiliary data.

BRIEF DESCRIPTION OF THE DRAWINGS

These and other objects and features of the present invention will become apparent from the following description taken in conjunction with the preferred embodiment thereof with reference to the accompanying drawings, in which:

FIG. 11A is a schematic diagram showing a data format of a Sync block structure of video and audio data to be recorded onto the magnetic tape 400 and to be reproduced from the magnetic tape 400;

FIG. 11B is a schematic diagram showing a data format of a DIF block structure of video and audio data outputted from block forming circuits 1004 and 1005 shown in FIG. 10;

FIG. 11C is a schematic diagram showing a data format of a Sync block structure of subcode data to be recorded onto the magnetic tape 400 and to be reproduced from the magnetic tape 400;

FIG. 11D is a schematic diagram showing a data format of a DIF block structure of subcode data outputted from block forming circuits 1004 and 1005 shown in FIG. 10;

FIGS. 19A, 19B, 19C, 19D, 19E and 19F are timing charts of respective blocks of a transmission unit block showing an operation of the transmission unit data constituting circuit 901 of the first preferred embodiment shown in FIG. 10.

DETAILED DESCRIPTION OF THE PREFERRED EMBODIMENTS

Preferred embodiments according to the present invention will be described below in detail with reference to the attached drawings.

First Preferred Embodiment

Figure 1:
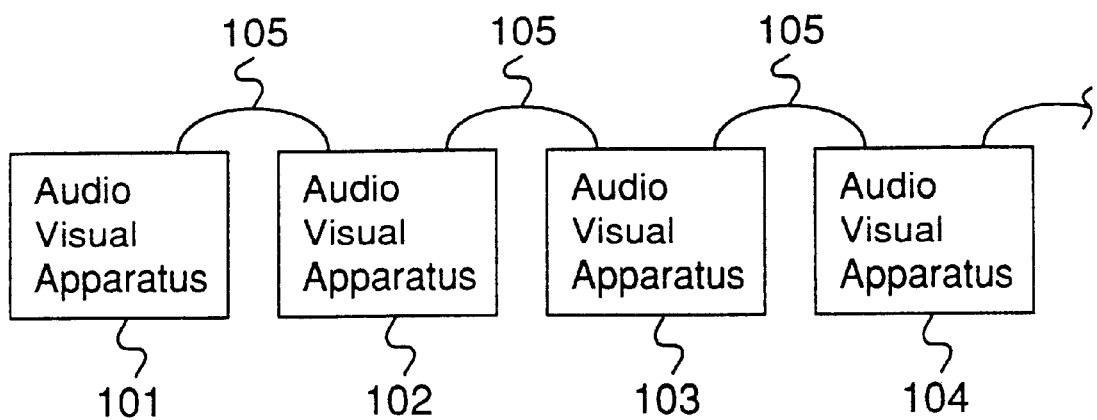
FIG. 1 is a schematic block diagram showing an exemplified connection between a plurality of audio visual apparatuses 101 to 104.

FIG. 1 shows an exemplified connection between a plurality of audio visual apparatuses such as digital VCRs or the like, and in particular, four audio visual apparatuses 101 to 104 are shown in FIG. 1.

Referring to FIG. 1, the audio visual apparatuses 101, 102, 103 and 104 are connected by way of respective line cables 105. The audio visual apparatuses 101, 102, 103 and 104 are the apparatuses capable of inputting and outputting information of video and audio in a form of digital signals. The apparatuses 101 to 104 are, for example, digital VCRs.

Figure 2:
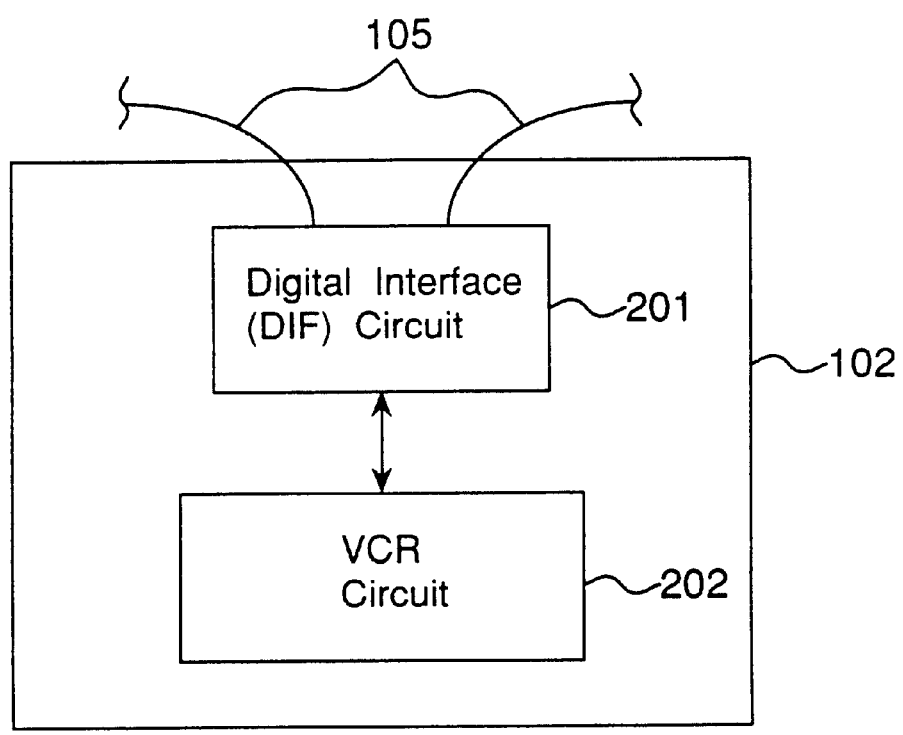
FIG. 2 is a schematic block diagram showing a structure of a digital VCR 102 of a first preferred embodiment according to the present invention.

Reference is made to the audio visual apparatuses taking an audio visual apparatus 102 shown in FIG. 2 as an example. In FIG. 2, the audio visual apparatus 102 is a digital VCR, which comprises a digital interface circuit (DIF circuit) 201 and a VCR circuit 202. A video signal and an audio signal are recorded in a form of digital signals onto a magnetic tape by the VCR circuit 202. Not only the video and audio data which have been subject to a digital signal process and are to be recorded into the magnetic tape, but also the video and audio data reproduced from the magnetic tape are inputted to the digital interface circuit 201, and then are transmitted from the digital interface circuit 201 to another audio visual apparatus (for example, 103) by way of the cable 105.

Figure 3:
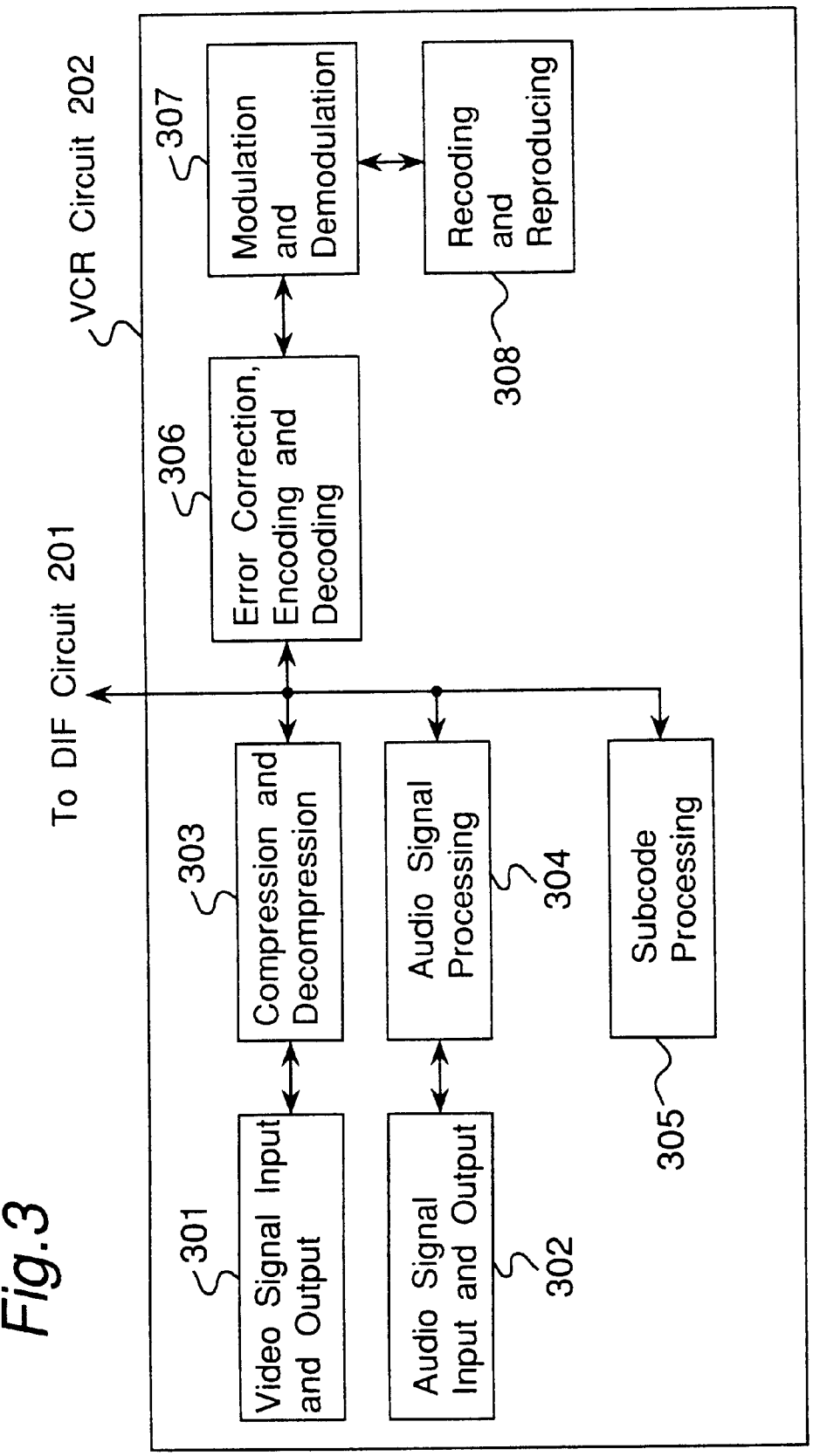
FIG. 3 is a schematic block diagram showing a VCR circuit 202 shown in FIG. 3.

FIG. 3 shows the VCR circuit 202 shown in FIG. 2.

First of all, reference is made to an operation of the VCR circuit 202 in the recording stage. A video signal is inputted as an analog signal to a video signal input and output circuit 301, and then the video signal is converted into a digital signal by the video signal input and output circuit 301. Thereafter, the converted digital video signal is inputted to a compression and decompression circuit 303, and then the digital video signal is data-compressed by the compression and decompression circuit 303, resulting in obtaining a reduced data volume of the digital video signal.

Further, an analog audio signal is inputted to an audio signal input and output circuit 302, and then the analog audio signal is converted into a digital audio signal by the audio signal input and output circuit 302. Thereafter, an audio signal processing circuit 304 performs a predetermined signal process on the digital audio signal inputted from the audio signal input and output circuit 302.

Further, a subcode processing circuit 305 generates data of time code and the like. To an error correction encoding and decoding circuit 306 are inputted the video data and the audio data from the compression and decompression circuit 303 and the audio signal processing circuit 304, whereas the subcode data is inputted from the subcode processing circuit 305 to the error correction encoding and decoding circuit 306. Then the error correction encoding and decoding circuit 306 performs an error correction encoding process on the data inputted from the compression and decompression circuit 303, the audio signal processing circuit 304, and the subcode processing circuit 305.

Furthermore, a modulation and demodulation circuit 307 modulates a carrier signal according to the data which has undergone the error correction encoding process and are inputted from the error correction encoding and decoding circuit 306. Thereafter, a recording and reproducing circuit 308 records the signal modulated by the modulation and demodulation circuit 307 onto a magnetic tape with a set of magnetic heads (not shown).

On the other hand, reference is made to an operation of the VCR circuit 202 in the reproducing stage.

The recording and reproducing circuit 308 reproduces the signal recorded on the magnetic tape with a set of magnetic heads (not shown), and then the modulation and demodulation circuit 307 demodulates the reproduced modulated signal inputted from the recording and reproducing circuit 308 so as to obtain demodulated digital data. The digital data demodulated by the modulation and demodulation circuit 307 undergoes a decoding process in the error correction encoding and decoding circuit 306. In the decoding process, when an error exists within the demodulated digital data, the error is corrected. When the error cannot be corrected, there is performed a process of replacing the error with data presumed to be most accurate. Further, the decoded video data is inputted to the compression and decompression circuit 303, in which the compressed data is decompressed and then the decompressed data is outputted to the video signal input and output circuit 301. Thereafter, the video signal input and output circuit 301 converts the inputted video data into an analog signal. Then the decoded audio signal is inputted to the audio signal processing circuit 304, and then undergoes a predetermined process, thereafter, the processed audio signal being outputted to the audio signal input and output circuit 302. Thereafter, the audio signal input and output circuit 302 converts the inputted digital audio data into an analog signal.

Further, the decoded subcode data is inputted to the subcode processing circuit 305, and then undergoes a predetermined process.

In outputting data reproduced by the VCR circuit 201 from the digital VCR to another digital VCR in a form of a digital signal, the audio data, the video data and the subcode data outputted from the error correction encoding and decoding circuit 306 are outputted to the digital interface circuit 201 in the present preferred embodiment, together with timing signals.

The digital interface circuit 201 transmits these data to another digital VCR. When the video data, the audio data, the subcode data, and the like are inputted and received in a form of digital signals, respectively, from another digital VCR and then are recorded onto the magnetic tape. The digital interface circuit 201 receives these data transmitted from another digital VCR, and transmits these data to the error correction encoding and decoding circuit 306. Since the video signal is transmitted in a form of a compressed digital video signal in the present preferred embodiment, there occurs no deterioration of the quality of the image or the video signal upon transmitting the video signal to another digital VCR so far as an error takes place on the transmission line of the line cable 105.

Figure 4:
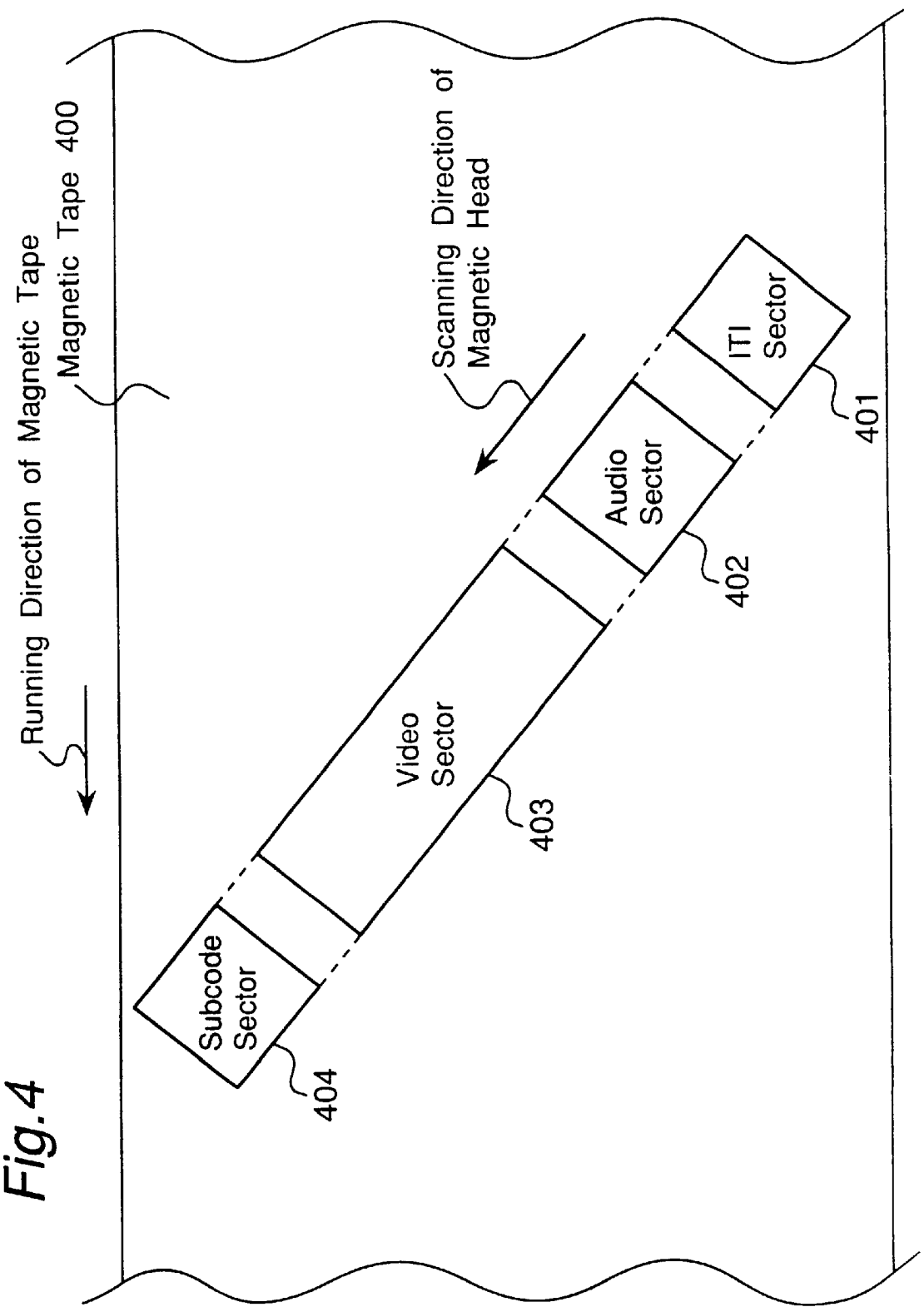
FIG. 4 is a front view of a magnetic tape 400 showing a track format of the digital VCR on the magnetic tape 400 on which the VCR circuit 202 shown in FIG. 3 records data.

FIG. 4 is a front view of a magnetic tape 400 showing a track format of the digital VCR on the magnetic tape 400 on which the VCR circuit 202 shown in FIG. 3 records data.

Referring to FIG. 4, each track comprises an ITI sector 401, an audio sector 402, a video sector 403, and a subcode sector 404. In the ITI sector 401, there are recorded not only data for correctly executing insert but also data representing a sector structure subsequent to the ITI sector. The data representing the sector structure indicates that the audio sector, the video sector, and the subcode sector exist behind the ITI sector.

In the television broadcasting system of 525 horizontal scanning lines and a field frequency of 60 Hz, one frame is composed of 10 tracks. In the television broadcasting system of 625 horizontal scanning lines and a field frequency of 50 Hz, one frame is composed of 12 tracks. Similarly in the high-definition television (HDTV) broadcasting system of 1125 horizontal scanning line and a field frequency of 60 Hz which is called a high vision broadcasting system, one frame is composed of 20 tracks. In the high-definition television broadcasting system of 1250 horizontal scanning lines and a field frequency of 50 Hz, one frame is composed of 24 tracks. In detail, the amount of data to be recorded in each of the high-definition television broadcasting system is just two times as great as that of each of the corresponding current television broadcasting systems. Further, it is noted that each sector is composed of a plurality of sync blocks.

FIGS. 5, 6, 7 and 8 show data formats of respective sectors to be recorded in each track of the magnetic tape 400, wherein bit sequence of each data format is transmitted, namely, recorded or reproduced, in the horizontal direction from the left to the right, and in the vertical direction from the bottom to the top.

Figure 5:
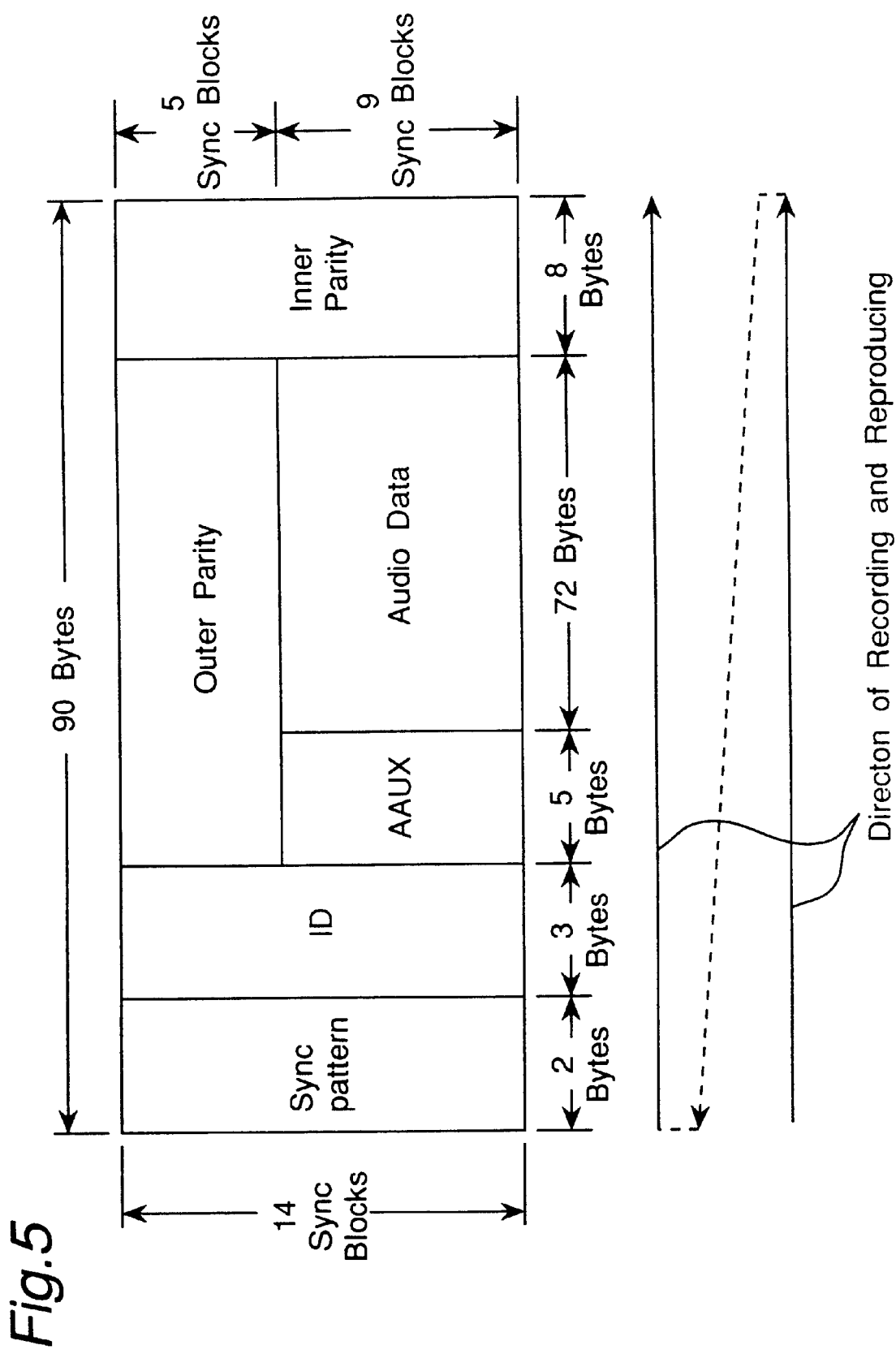
FIG. 5 is a schematic diagram showing a data format of an audio sector 402 to be recorded in each track of the magnetic tape 400.

FIG. 5 shows a data format of an audio sector 402 to be recorded in each track of the magnetic tape 400.

Referring to FIG. 5, the audio sector is composed of 14 sync blocks, each sync block having a length of 90 bytes. The 14 sync blocks includes nine sync blocks comprising audio data and AAUX data including additional information related to the audio data, and five sync blocks of outer parity which is a parity for error correction for the above-mentioned nine sync blocks.

Each sync block is composed of:

(a) a two-byte sync pattern for sync block synchronization;

(b) a three-byte of an ID (Identification Data) which includes information for identifying each track and each sync block;

(c) a 77-byte data which is either the AAUX data and the audio data or the outer parity; and (d) an eight-byte inner parity for error correction for the above-mentioned 77-byte data.

The first five bytes of the above-mentioned 77-byte data represent the AAUX data related to the audio data to be recorded on the magnetic tape, and the other last 72-bytes thereof represent the audio data, wherein the AAUX data includes (a) information of a sampling frequency of the audio data; (b) information of a reproducing speed; and (c) information of the number of the channels of the audio data etc.

Figure 6:
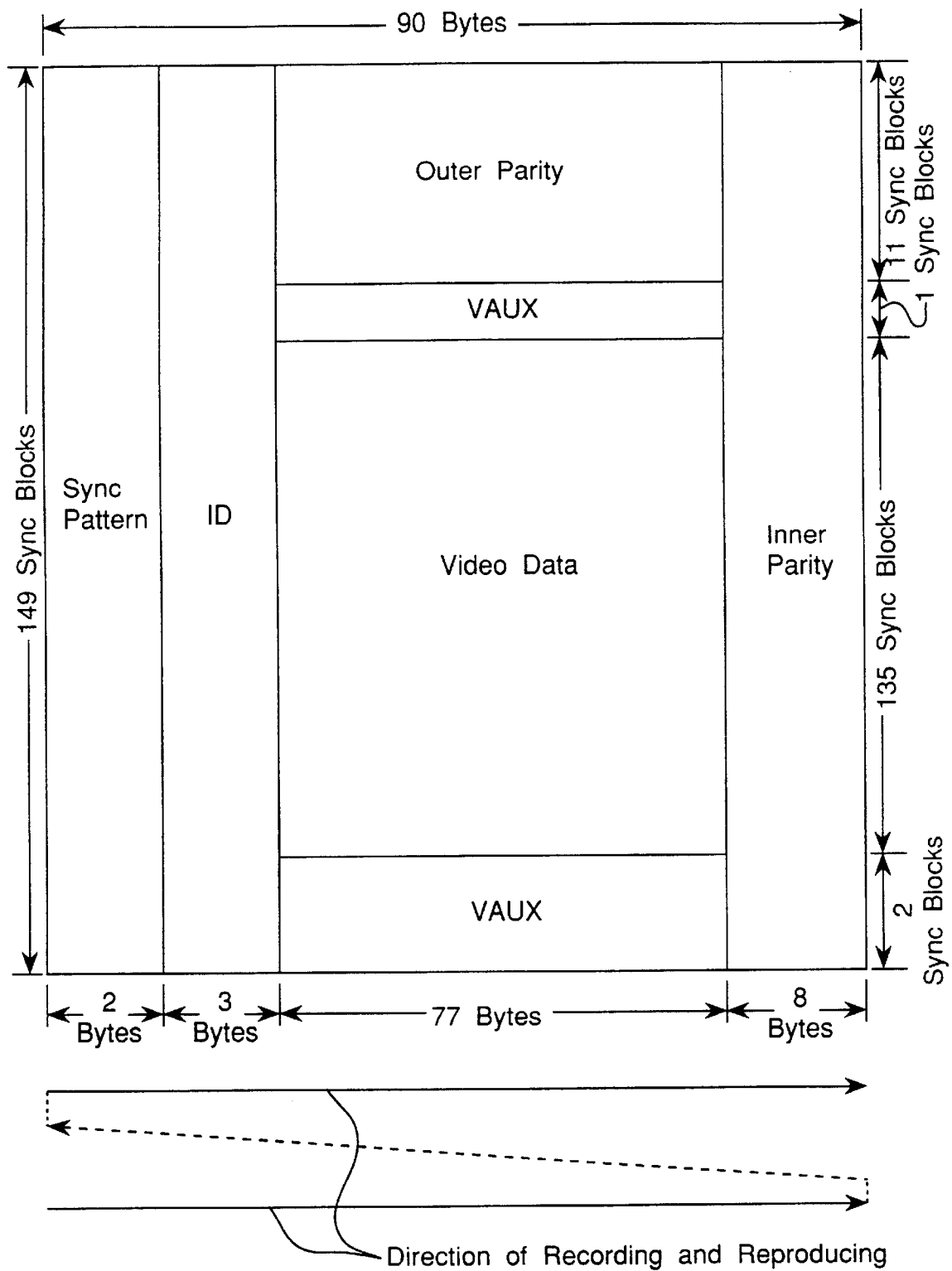
FIG. 6 is a schematic diagram showing a data format of a video sector 403 to be recorded in each track of the magnetic tape 400.

FIG. 6 shows a data format of the video sector 403 to be recorded in each track of the magnetic tape 400.

Referring to FIG. 6, the video sector is composed of 149 sync blocks, each sync block having a length of 90 bytes. The 149 sync blocks includes:

(a) 135 sync blocks of video data;

(b) three sync blocks of the VAUX data which are additional auxiliary data related to the video data to be recorded on the magnetic tape, wherein the VAUX data include information of the television broadcasting system of the video data, information of an input source such as a camera, a television tuner, or the like, and the other information; and (c) 11 sync blocks of outer parity for error correction for not only the video data to be recorded in the above-mentioned 135 sync blocks, but also the VAUX data to be recorded in the above-mentioned three sync blocks.

Each sync block is composed of:

(a) a two-byte sync pattern for sync block synchronization;

(b) a three-byte ID (Identification Data) which includes information for identifying each track and each sync block;

(c) a 77-byte data which are either one of the video data, the VAUX data and the outer parity; and (d) an eight-byte inner parity for error correction for the above-mentioned 77-byte data; in a manner similar to that of the sync blocks of the audio sector shown in FIG. 5.

Figure 7:
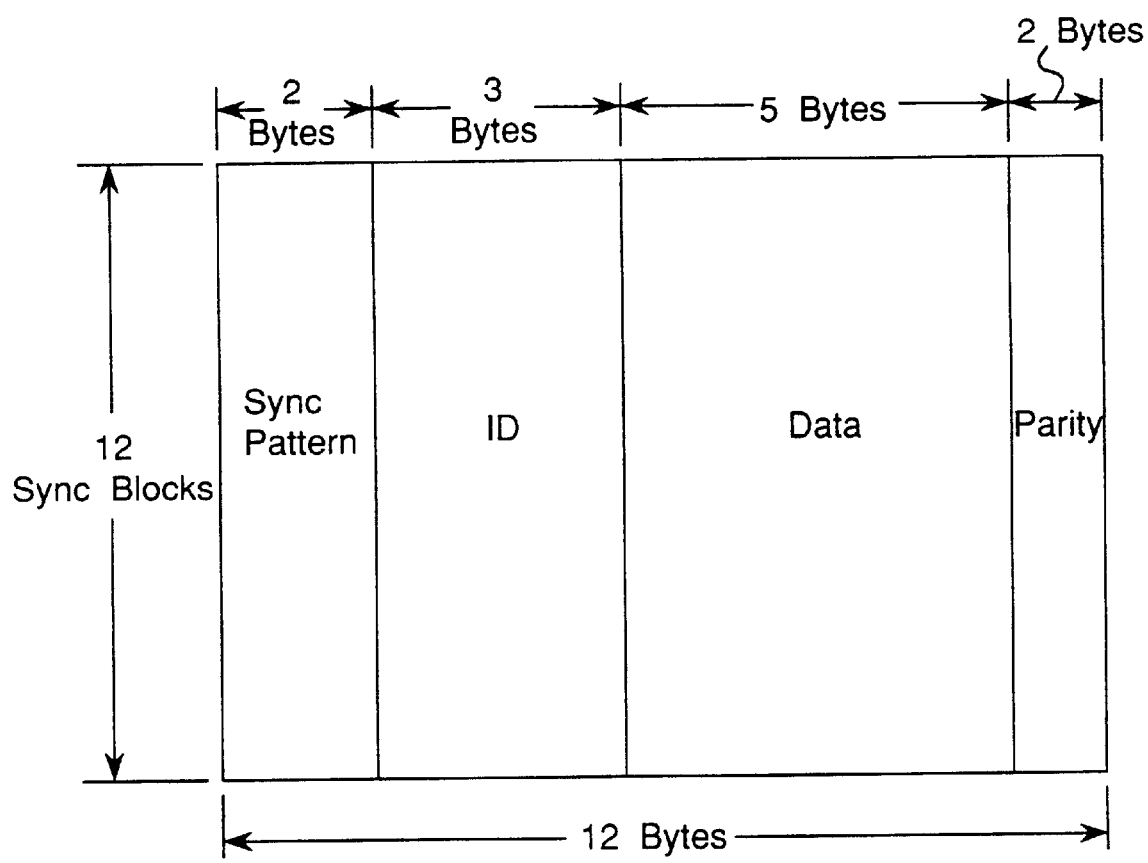
FIG. 7 is a schematic diagram showing a data format of a subcode sector 404 to be recorded in each track of the magnetic tape 400.

FIG. 7 shows a data format of the subcode sector 404 to be recorded in each track of the magnetic tape 400.

Referring to FIG. 7, the subcode sector is composed of 12 sync blocks, each sync block having a length of 12 bytes. Each sync block is composed of:

(a) a two-byte sync pattern for sync block synchronization;

(b) a three-byte ID (Identification Data) which includes information for identifying each track and each sync block;

(c) a five-byte data including a time code representing elapsed time from the beginning of the magnetic tape, and an absolute track serial number from the start end of the magnetic tape; and (d) a two-byte parity for error correction for the above-mentioned five-byte data.

The above-mentioned AAUX data, VAUX data and subcode data are arranged within the sync blocks so as to be divided into five-byte data, wherein each five-byte data is called a "PACK".

Figure 8:
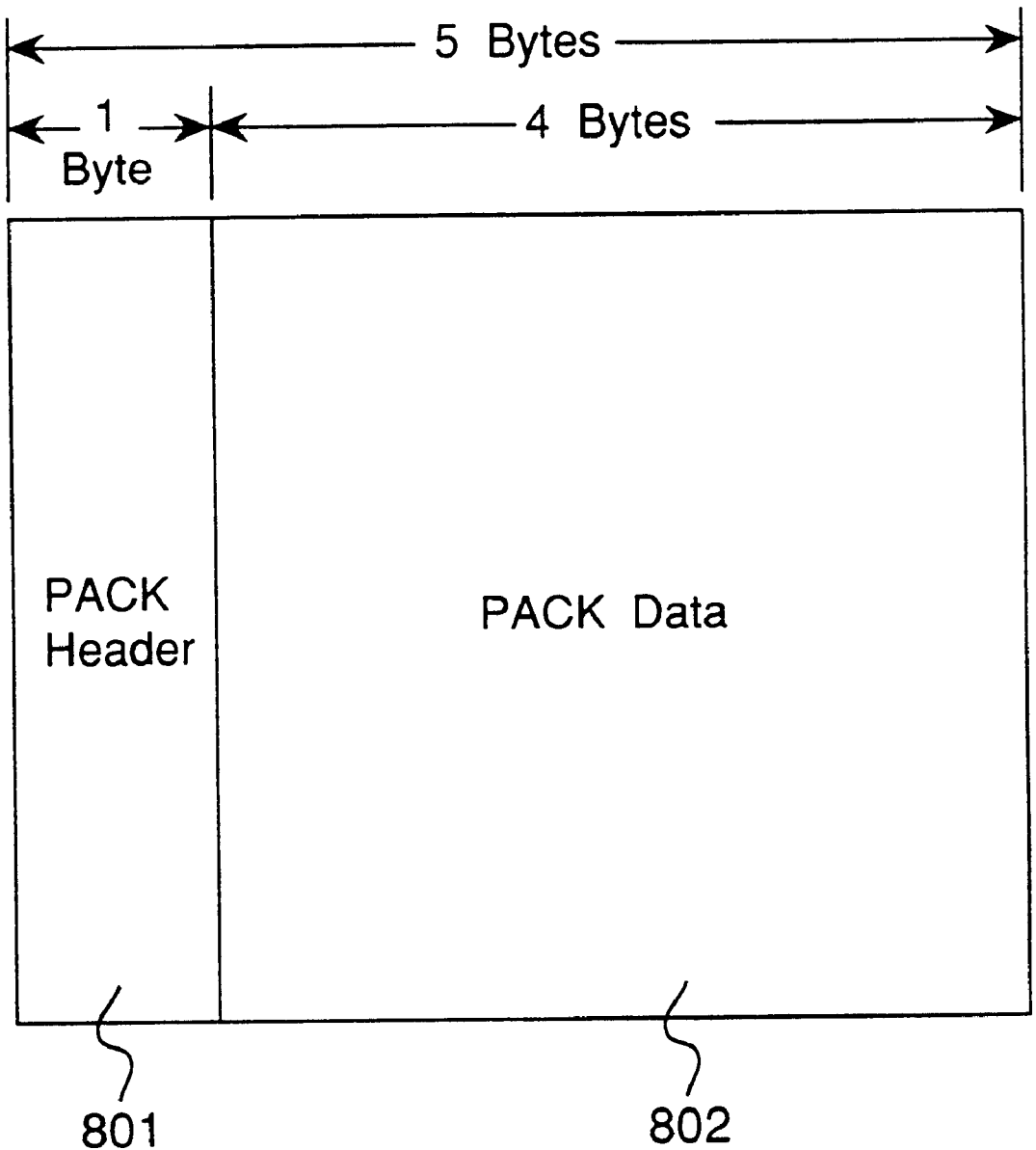
FIG. 8 is a schematic diagram showing a data format of a PACK included in the tape format.

FIG. 8 shows a data format of the PACK included in the tape format.

Referring to FIG. 8, the five-byte unit includes (a) a one-byte data 801 referred to as a "PACK header" for defining the contents of the PACK; and (b) a four-byte PACK data 802 including information data corresponding to the PACK header.

Figure 9:
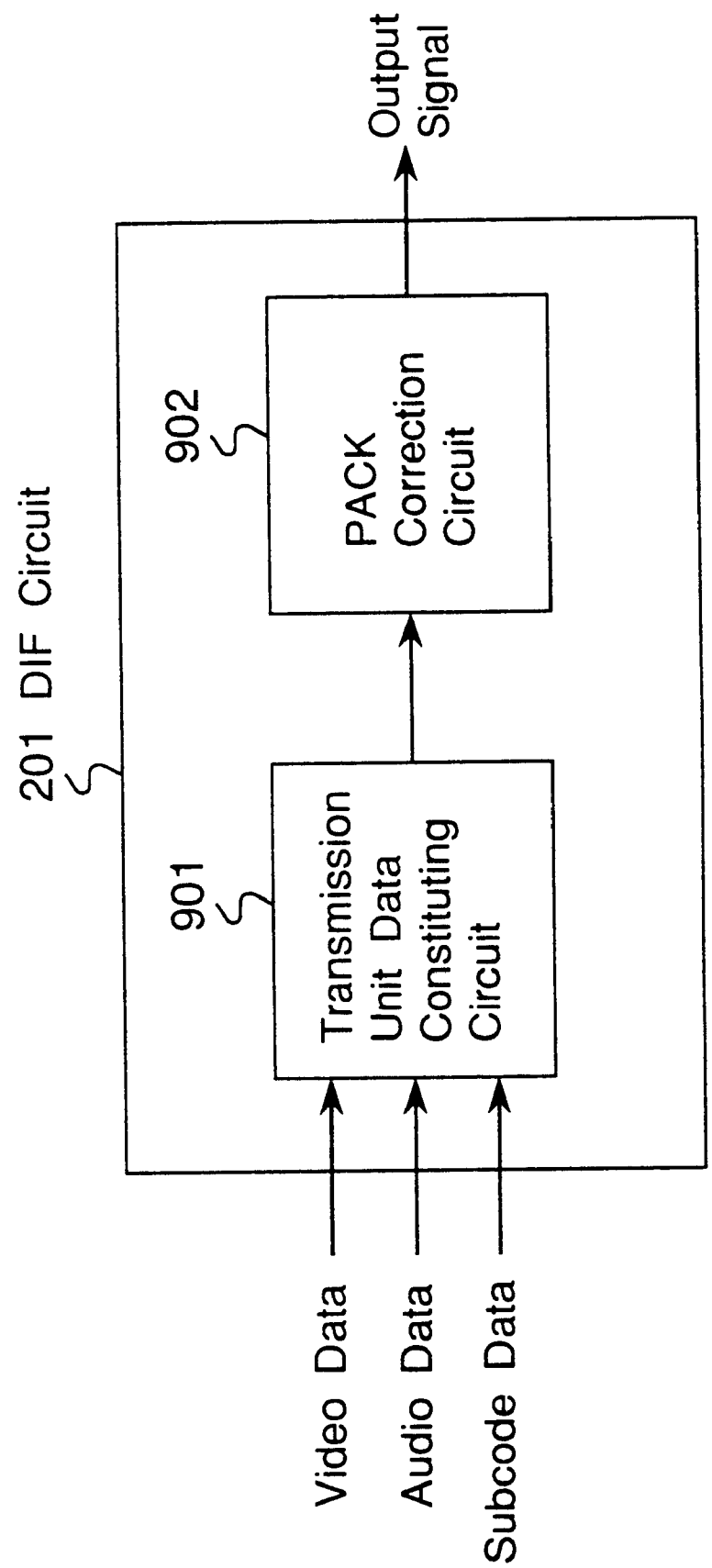
FIG. 9 is a schematic block diagram showing a DIF circuit 201 shown in FIG. 2.

FIG. 9 is a schematic block diagram of the digital interface (DIF) circuit 201 shown in FIG. 2, in particular, FIG. 9 shows an operation of the digital interface circuit 201 upon outputting data to another digital VCR.

Referring to FIG. 9, the digital interface circuit 201 comprises a transmission unit data constituting circuit 901 and a PACK correction circuit 902. The audio data, the video data and the subcode data inputted from the VCR circuit 202 are collected in a predetermined transmission unit by the transmission unit data constituting circuit 901. The PACK correction circuit 902 checks the contents of important PACKS of the AAUX data, the VAUX data and the subcode data, which are to be transmitted to another digital VCR, a plurality of times in one frame. When the PACKs having different contents exist in one frame, the PACK data are unified to be selected so that major identical contents exist in one frame, as described in detail later.

Figure 10:
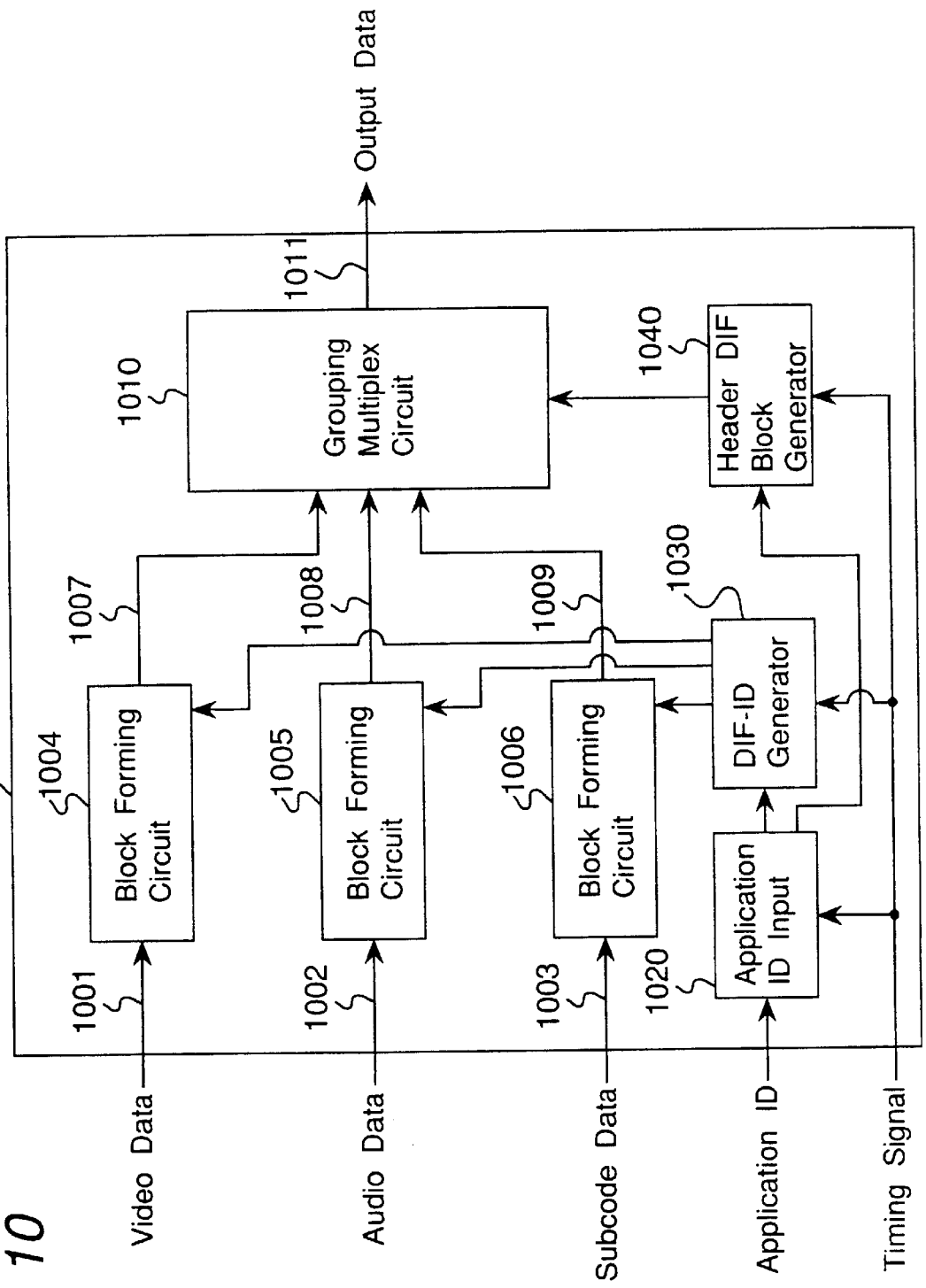
FIG. 10 is a schematic block diagram showing a transmission unit data constituting circuit 901 of the first preferred embodiment shown in FIG. 9.

FIG. 10 is a schematic block diagram of the transmission unit data constituting circuit 901 of the first preferred embodiment shown in FIG. 9

Referring to FIG. 10, the transmission unit data constituting circuit 901 comprises a block forming circuit 1004, a block forming circuit 1005, a block forming circuit 1006, and a grouping multiplex circuit 1010.

Video data 1001 is compressed video data inputted from the compression and decompression circuit 303 or the error correction encoding and decoding circuit 306 of the VCR circuit 202. Audio data 1002 is audio data inputted from the audio signal processing circuit 304 or the error correction encoding and decoding circuit 306 of the VCR circuit 202. Subcode data 1003 is subcode data inputted from the subcode processing circuit 305 or the error correction encoding and decoding circuit 306 of the VCR circuit 202.

The video data 1001, the audio data 1002, and the subcode data 1003 are inputted, respectively, to the block forming circuit 1004, the block forming circuit 1005, and the block forming circuit 1006, together with a timing signal sent from the VCR circuit 202 so that these data 1001 to 1003 can be time-multiplexed by a grouping multiplex circuit 1010 so as not to be superimposed on each other, as shown in timing charts of FIGS. 19A to 19F.

In the present preferred embodiment, there exist the audio sector 402, the video sector 403, and the subcode sector 404 on the magnetic tape 400 as shown in FIG. 4, and further in each of the sectors 402 to 404, an application ID which is a sector structure flag representing a structure or composition of each sector is recorded. Hereinafter, the application ID of the audio sector 402 is referred to as an "AP1", the application ID of the video sector 403 is referred to as an "AP2", and similarly the application ID of the subcode sector 404 is referred to as an "AP3". In the ITI sector 401 of each track on the magnetic tape 400, there is recorded an application ID which is a flag representing a structure or composition of each track, such as the number of the sectors, the position of the sector, and the like in the track. The application ID recorded in the ITI sector is referred to as an "APT" hereinafter.

Referring back to FIG. 10, the transmission unit data constituting circuit 901 further comprises an application ID input circuit 1020, a DIF-ID generator 1030, and a header DIF block generator 1040, wherein the above-mentioned timing signal is inputted to these circuits 1020, 1030 and 1040 for not only block forming process performed in the block forming circuits 1004, 1005 and 1006, but also the grouping multiplex process performed in the grouping multiplex circuit 1010.

The application ID input circuit 1020 receives the application IDs including the APT, the AP1, the AP2 and the AP3 to be recorded onto a magnetic tape or to be reproduced from a magnetic tape, which are sent from the VCR circuit 202, and then outputs these application IDs to the DIF block generator 1030 and the header DIF block generator 1040. Further, the DIF block generator 1030 generates a DIF-ID for each sector based on the inputted application IDs including the APT, the AP1, the AP2 and the AP3, and then outputs the DIF-ID to the block forming circuits 1004, 1005 and 1006, thereafter, the DIF-ID being added therein to form each DIF block.

Furthermore, the header DIF block generator 1040 generates a 80-byte header DIF block based on the inputted application IDs including the APT, the AP1, the AP2 and the AP3, and then outputs the header DIF block to the grouping multiplex circuit 1010, thereafter, the header DIF block being added and time-multiplexed to the other DIF blocks to form each transmission block unit therein in a manner as described later.

The block forming circuit 1004 is provided for converting the video data 1001 into video data DIF block, and the block forming circuit 1005 is provided for converting the audio data 1002 into audio data DIF block.

FIGS. 11A and 11B show an operation of the block forming circuits 1004 and 1005, and a relationship between a data format of a Sync block structure of video and audio data to be recorded onto the magnetic tape 400 and to be reproduced from the magnetic tape 400, and a data format of a DIF block structure of video and audio data outputted from block forming circuits 1004 and 1005 shown in FIG. 10.

The video data and the audio data to be recorded onto a magnetic tape or to be reproduced from a magnetic tape have sync block structures as shown in FIG. 11A. Each of the block forming circuits 1004 and 1005 adds a 3-byte DIF-ID (Digital Interface Identification data) generated by the DIF-ID generator 1030, to the 77-byte data in the sync block so as to form a 80-byte DIF block, without the sync pattern, the ID and the parity, as shown in FIG. 11B. This 3-byte DIF-ID is identification data for the 77-byte data.

Further, the block forming circuit 1006 is provided for converting subcode data 1003 into a subcode DIF block.

FIGS. 11C and 11D show an operation of the block forming circuit 1006, and a relationship between a data format of a Sync block structure of subcode data to be recorded onto the magnetic tape 400 and to be reproduced from the magnetic tape 400, and a data format of a DIF block structure of subcode data outputted from block forming circuits 1004 and 1005 shown in FIG. 10.

As mentioned above, on the magnetic tape, the subcode sector in one track is composed of 12 sync blocks. The block forming circuit 1006 constitutes or forms one subcode DIF block from the 3-byte ID and 5-byte data of six sync blocks selected among the above 12 sync blocks. In regard to the remaining six sync blocks, another subcode DIF block is constituted or formed from the 3-byte ID and 5-byte data in the same manner as described above. In other words, the data in the subcode sector is distributed into two subcode DIF blocks, and then the subcode DIF blocks are transmitted to another digital VCR.

Before the head of each total six DIF blocks of 48 bytes (=8 bytes×6) is added a 3-byte DIF-ID (Digital Interface Identification Data) generated by the DIF-ID generator 1030, while a 29-byte dummy data are added behind each total six DIF blocks, then resulting in obtaining a DIF block length of 80 bytes which is the same length of the video data DIF block and the audio data DIF block, in the same manner as in the video data and audio data.

Referring back to FIG. 10, a video data DIF block 1007 outputted from the block forming circuit 1004, an audio data DIF block 1008 outputted from the block forming circuit 1005, and subcode data DIF block 1009 outputted from the block forming circuit 1006 are inputted to the grouping multiplex circuit 1010. Then, the grouping multiplex circuit 1010 groups the video data DIF block 1007, audio data DIF block 1008, and subcode data DIF block 1009 together with the header DIF block, through time-multiplex process approximately every $\frac{1}{300}$ second, so as to convert these DIF block 1007 to 1009 and the header DIF block into transmission group data 1011 of one transmission unit block. In other words, the total time interval length of the transmission group data 1011 of one transmission unit block corresponds to about $\frac{1}{300}$ second.

It is to be noted that the grouping multiplex circuit 1010 adds the header DIF block generated by the header DIF block generator 1040 to the head end of each group. The header DIF block is a DIF block having a length of 80 bytes including information representing the contents of the transmission unit collected by the grouping multiplex circuit 1010. In this case, a DIF-ID indicating that the DIF block is the header DIF block is added to the first 3 bytes within the 80 bytes in a manner similar to that of the other video, audio and subcode DIF blocks. The transmission group data 1011 outputted from the transmission unit data constituting circuit 901 is each group outputted every $\frac{1}{300}$ second to be transmitted from the digital VCR to another digital VCR in the present preferred embodiment.

The time of $\frac{1}{300}$ second is one tenth of one frame in the television broadcasting system having a frame frequency of 30 Hz, and is one twelfth of one frame in the television broadcasting system having a frame frequency of 50 Hz. In other words, by collecting the video data, the audio data, and the subcode data within one frame into ten or twelve groups, i.e., ten or twelve transmission group data, an identical transmission group data structure of each transmission unit block can be achieved in either the television broadcasting system having a frame frequency of 30 Hz or the television broadcasting system having a frame frequency of 50 Hz.

Figure 12:
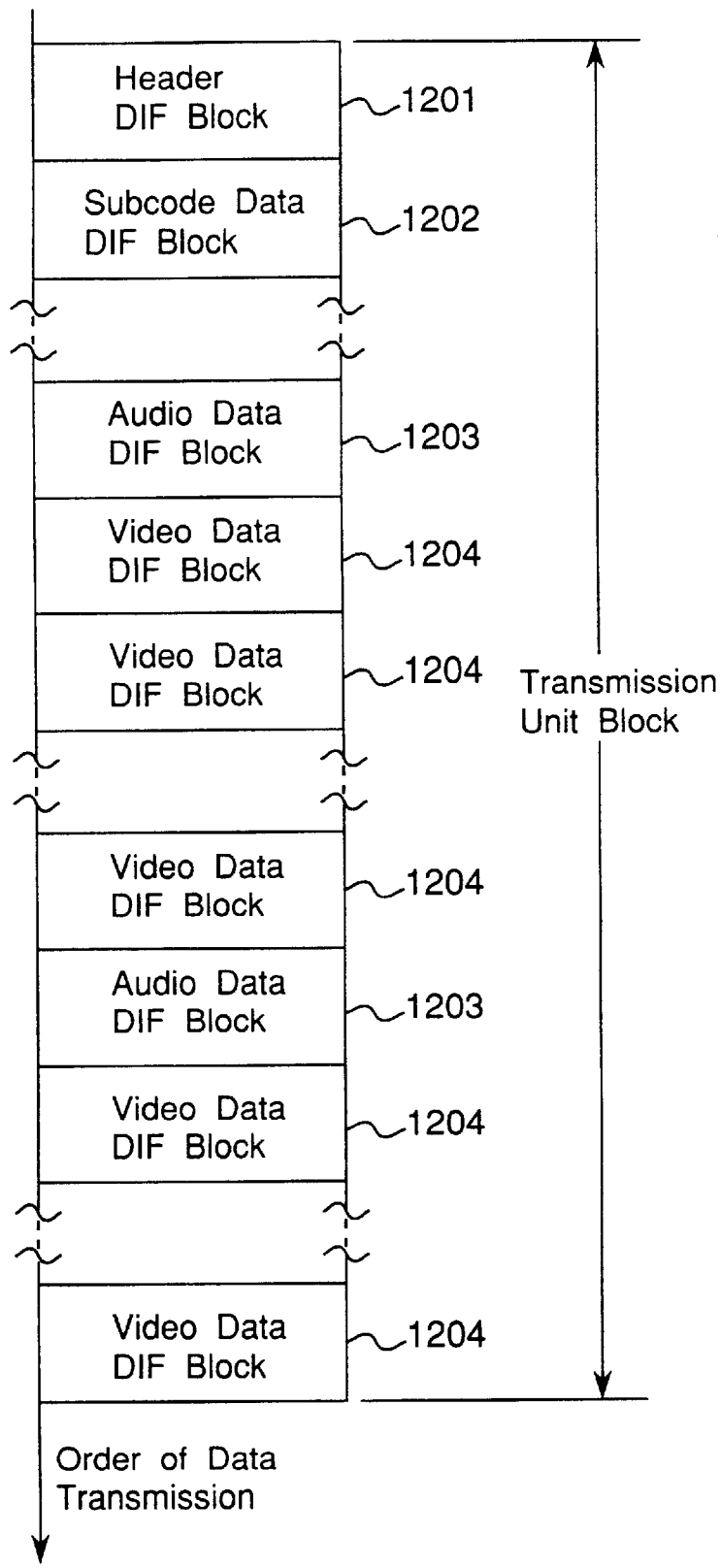
FIG. 12 is a schematic diagram showing a data format of a transmission unit block structure formed by the transmission unit data constituting circuit 901 shown in FIG. 10.

FIG. 12 shows a data format of a transmission unit block structure formed by the transmission unit data constituting circuit 901 shown in FIG. 10, and FIGS. 19A to 19F are the timing charts showing a process for forming the transmission group data of one transmission unit block in the grouping multiplex circuit 1010 shown in FIG. 10.

Referring to FIG. 12, each transmission group data of one transmission unit block is composed of a header DIF block 1201 including identification data of the group in one frame, a subcode data DIF block 1202, a plurality of audio data DIF blocks 1203, and a plurality of video data DIF blocks 1204.

As apparent from the above description, according to a data transmission apparatus provided with the transmission unit data constituting circuit 901 of the first preferred embodiment, the transmission on the video data, the audio data and the subcode data can be achieved in an identical manner in both of the television broadcasting system having a frame frequency of 25 Hz and the television broadcasting system having a frame frequency of 30 Hz, thereby obtaining a remarkably great advantageous effect of reducing the circuit scale of the data transmission apparatus.

In the present preferred embodiment, the data transmission is executed with the application IDs including the APT, the AP1, the AP2 and the AP3 representing a track structure and a sector structure arranged in the header DIF block. With the above-mentioned arrangement, by decoding the header DIF block on the receiver side, the structure of the DIF block transmitted subsequent to the header DIF block can be identified. Therefore, even when the recording format is changed in the recording apparatus, the change can be managed by changing the application IDs arranged in the header DIF block.

Figure 17:
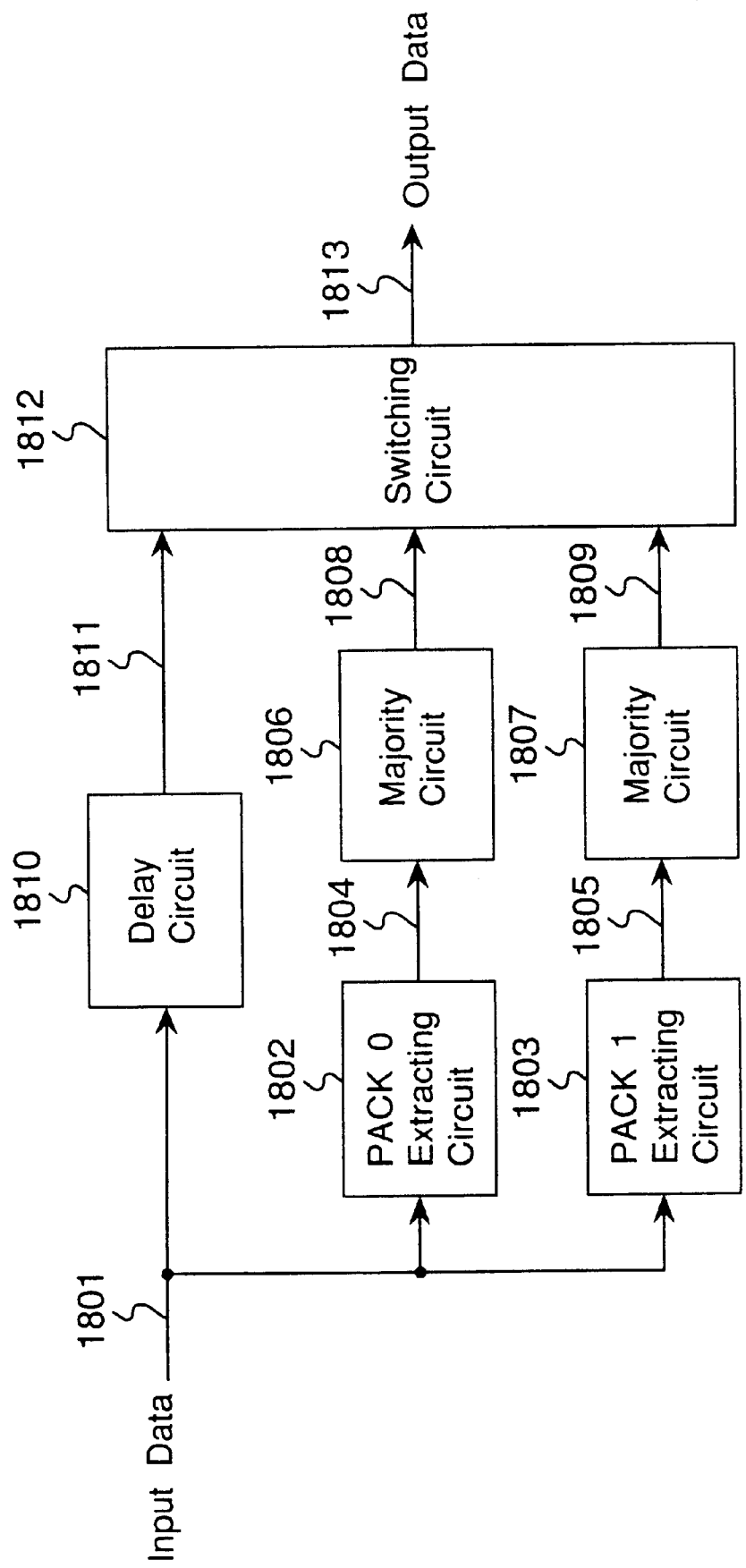
FIG. 17 is a schematic block diagram showing a PACK correction circuit 902 shown in FIG. 9.

FIG. 17 shows the PACK correction circuit 902 shown in FIG. 9.

The following describes a case where important data such as the television broadcasting system of the video signal, the sampling frequency of the audio signal, and the number of channels are recorded in two PACKs, i.e., PACK 0 and PACK 1.

Referring to FIG. 17, the PACK correction circuit 902 comprises a delay circuit 1810, a PACK 0 extracting circuit 1802, a PACK 1 extracting circuit 1803, majority circuits 1806 and 1807, and a switching circuit 1812.

Referring back to FIG. 8, a PACK is composed of five bytes, and the foremost first PACK header 801 defines the contents and the data format of the remaining 4-byte data. In the present preferred embodiment, two types of PACKs, i.e., a PACK 0 in which the PACK header 801 is "0" and a PACK 1 in which the PACK header 801 is "1" are transmitted a plurality of times in one frame. Upon transmitting the PACKs a plurality of times, the contents of the PACK is unified to the PACK presumed to be most accurate.

The input data 1801 inputted to the PACK correction circuit 902 is transmission group data of one transmission unit block grouped by the transmission unit data constituting circuit 901, after performing a correction process on the reproduced data by the error correction circuit of the VCR circuit 202.

The PACK 0 including the information of the television broadcasting system of the video signal and the like is recorded in the VAUX data area in the video sector shown in FIG. 6 on the magnetic tape, and is inputted as video data from the VCR circuit 202 to the digital interface circuit 201.

The PACK 1 including the sampling frequency of the audio signal, the number of channels, and the like is recorded in the AAUX data area in the audio sector shown in FIG. 5 on the magnetic tape, and is inputted as audio data from the VCR circuit 202 to the digital interface circuit 201.

The PACK 0 extracting circuit 1802 extracts the PACK having the PACK header 801 of "0" from the input data 1801. The extracted PACK 1804 having the PACK header 801 of "0" is inputted to a majority circuit 1806. The majority circuit 1806 checks the contents of the PACK data 802 having the PACK header 801 of "0", counts the numbers of PACKs having the PACK header 801 of "0" and identical contents every different contents of the PACK data 802, and selects and outputs the PACK of the greatest counted number within one frame to the switching circuit 1812.

On the other hand, the PACK 1 extracting circuit 1803 extracts a PACK having the PACK header 801 of "1" from the input data 1801. The extracted PACK 1805 having the PACK header 801 of "1" is inputted to a majority circuit 1807. The majority circuit 1807 checks the contents of the PACK data 802 having the PACK header 801 of "1", counts the number of PACKs having the PACK header 801 of "1" and identical contents every different contents, and selects and outputs the PACK of the greatest counted number in one frame, to the switching circuit 1812.

The output PACKs 1808 and 1809 are the PACKs outputted from the majority circuits 1806 and 1807. The delay circuit 1810 is provided for delaying the input data 1801 by one frame, wherein one frame corresponds to the processing time interval of the PACK 0 extracting circuit 1802 and the majority circuit 1806, and the processing time interval of the PACK 1 extracting circuit 1803 and the majority circuit 1807. The delayed data 1811 is the data obtained by delaying the input data 1801 by one frame by means of the delay circuit 1810. Further, the switching circuit 1812 is provided for replacing the PACK having the PACK header 801 of "0" and the PACK having the PACK header 801 of "1" in the delay data 1811 respectively with the PACK data 1808 and 1809. The output data 1813 from the switching circuit 1812 is the output data obtained by unifying the PACK having the PACK header 801 of "0" and the PACK having the PACK header 801 of "1" to the PACKs having contents presumed to be most accurate.

Figure 18:
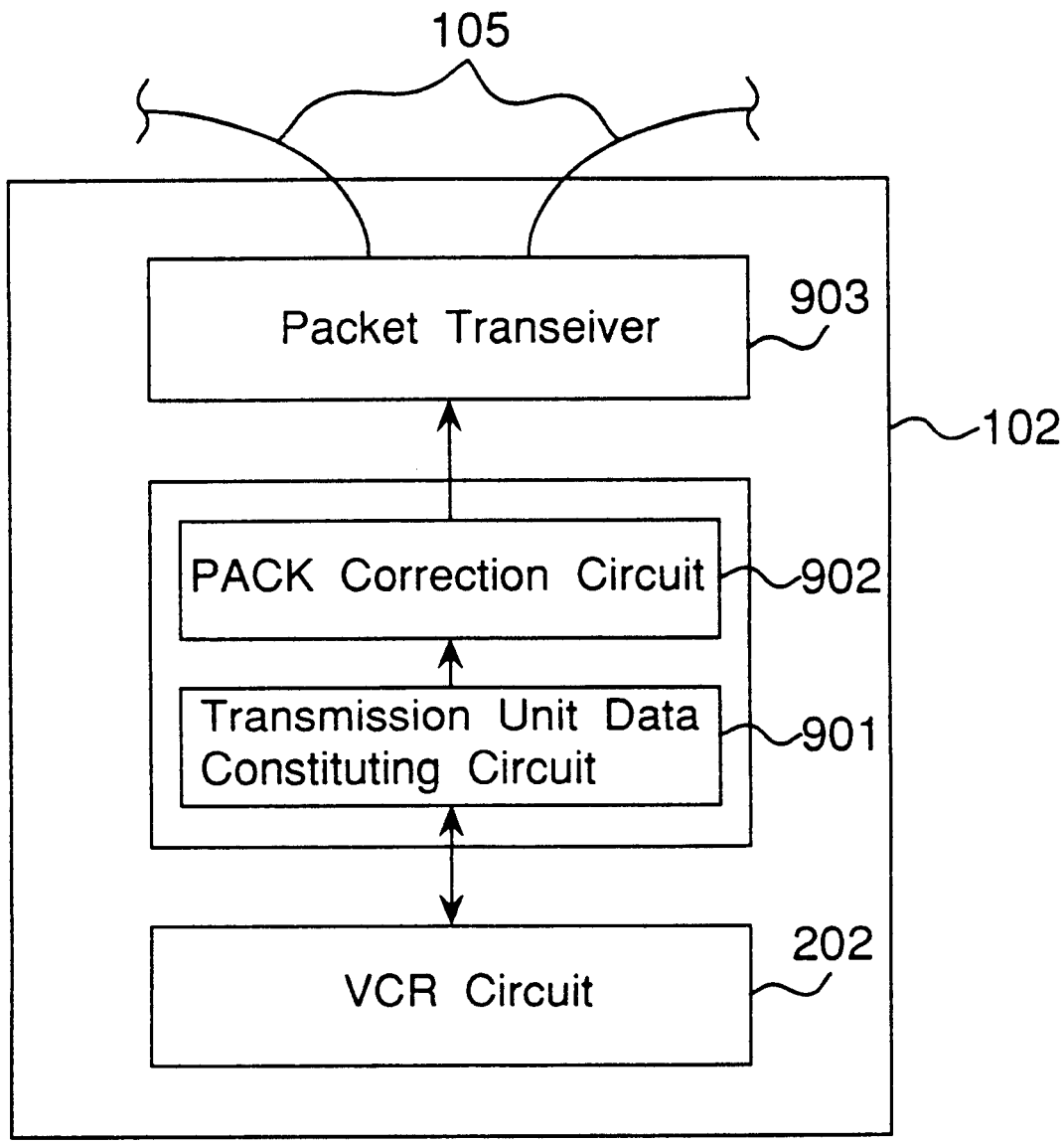
FIG. 18 is a schematic block diagram showing a digital VCR of a modification of the preferred embodiment according to the present invention.

The transmission group data of one transmission unit block are preferably transmitted from one digital VCR to another digital VCR, in a form of packet. As shown in FIG. 18, a packet transceiver 903 for transmitting and receiving the transmission group data of one transmission unit block in a form of packet may be inserted between the PACK correction circuit 902 and the line cable 105.

Although the present preferred embodiment shows the case where the number of PACKs of which contents are unified is two, the number of PACKs of which contents are unified may be increased by increasing the number of the majority circuits.

In regard to the audio signal, when, for example, a two-channel audio signal is recorded, the signal can be edited independently in every channel. Therefore, the AAUX has different contents in independently editable units. Therefore, the AAUX related to the audio data is transmitted with its contents unified in independently editable units on the magnetic tape within one frame.

According to the present preferred embodiment of the present invention, there can be solved such problems that the selection of the television broadcasting system of the video signal and the setting of the sampling frequency of the audio signal and the number of channels cannot be achieved in the digital VTR on the receiver side occurring when the error correction is executed by mistake in the error correction stage and consequently the PACKs having different contents are transmitted in regard to the PACKs transmitted a plurality of times with identical contents.

Second Preferred Embodiment

Figure 13:
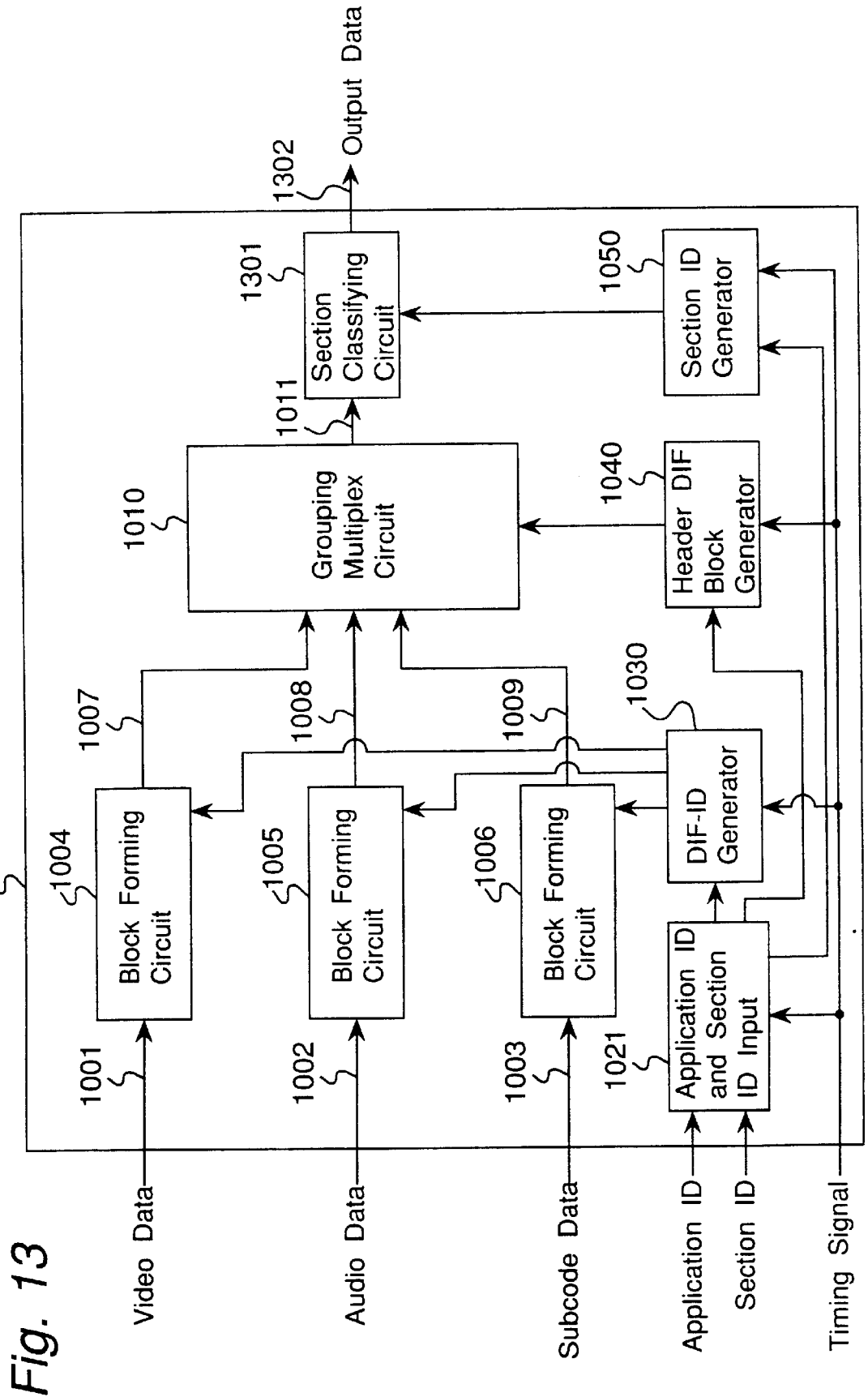
FIG. 13 is a schematic block diagram showing a transmission unit data constituting circuit 901a of a second preferred embodiment according to the present invention.

FIG. 13 shows a transmission unit data constituting circuit 901a of the second preferred embodiment according to the present invention, which may be replaced with the transmission unit data constituting circuit 901 of the first preferred embodiment shown in FIG. 10.

As is apparent from comparison between FIGS. 10 and 13, the differences between the transmission unit data constituting circuits 901 and 901a of the first and second preferred embodiments are as follows:

(a) the application ID input circuit 1020 is replaced with an application ID and section ID input circuit 1021; and (b) the transmission unit data constituting circuit 901 further comprises a section ID generator 1050 and a section classifying circuit 1301 which is inserted at the output stage of the grouping multiplex circuit 1010.

A section ID representing whether the video and audio data are of the high-definition television broadcasting system or the current television broadcasting system is inputted through the application ID and section ID input circuit 1021 to the section ID generator 1050, which generate the section ID of one bit for the DIF-ID and outputs the same to the section classifying circuit 1301.

When the amount of data to be transmitted is greater as in the high-definition television broadcasting system as compared with that of the current television broadcasting system, the section classifying circuit 1301 classifies each DIF block in each group into sections, and adds section identification data generated by the section ID generator 1050 to the DIF-ID in each DIF block. As shown in FIG. 13, the transmission group data 1011 is inputted to the section classifying circuit 1301.

Figure 14:
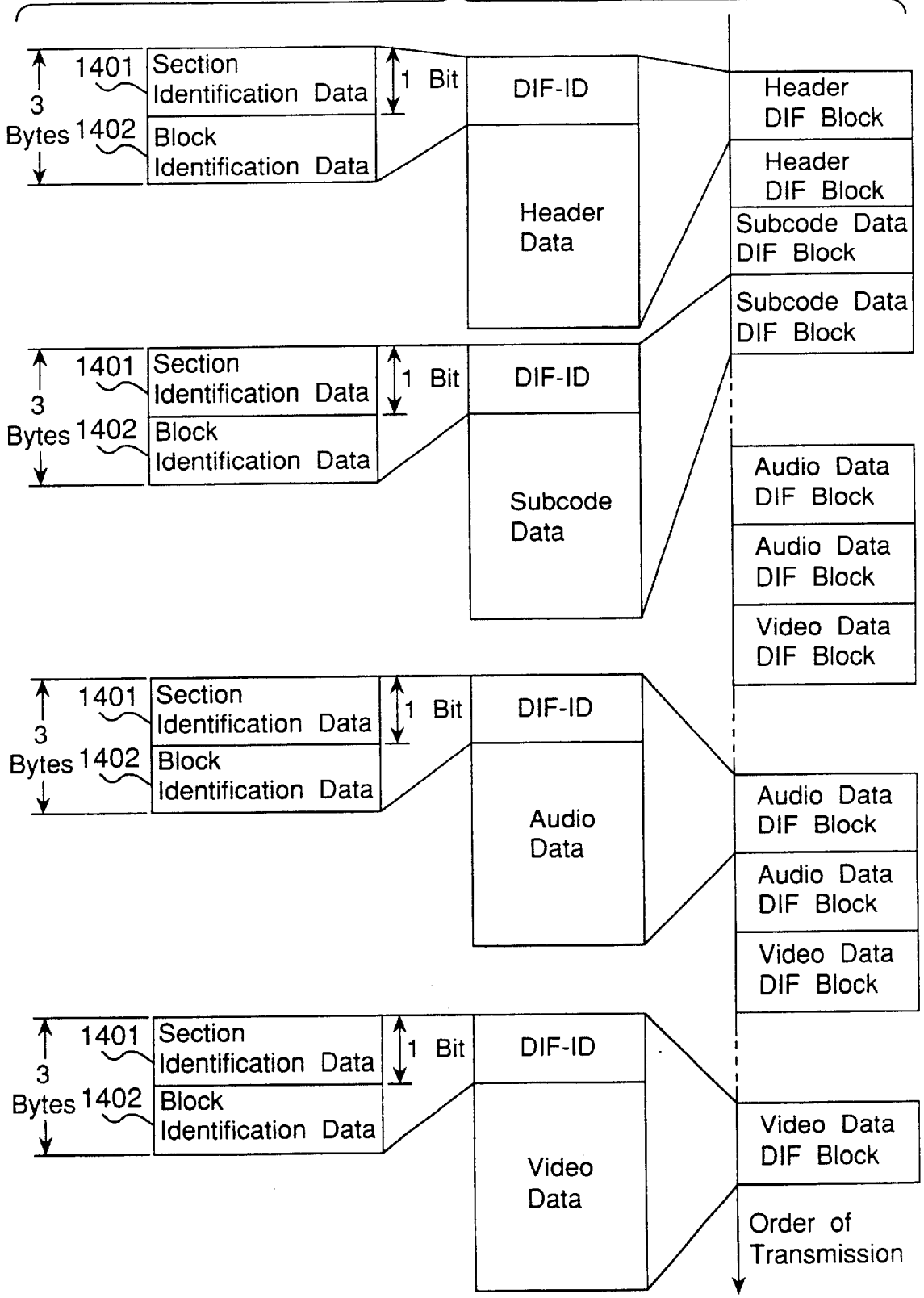
FIG. 14 is a schematic diagram showing a data format of a transmission unit block structure formed by the transmission unit data constituting circuit 901a shown in FIG. 13.

FIG. 14 shows a data format of a transmission unit block structure formed by the transmission unit data constituting circuit 901a shown in FIG. 13.

Since FIG. 14 shows an example in which the transmission is executed in the high-definition television broadcasting system, two same DIF blocks are continuously arranged. The above arrangement is provided because data of the high-definition television broadcasting system are classified into two sections. In this case, a section identification data 1401 of one bit and a block identification data of each DIF block are incorporated in the DIF-ID of each block. The section identification data of one bit is an identifier indicating which section the DIF block belongs to. The block identification data is information for identifying each DIF block in each section.

In the present preferred embodiment, the section identification data 1401 is assumed to be "0" in every DIF block for the current television broadcasting system. Since the amount of data to be transmitted in the high-definition television broadcasting system is designed to be tow times as great as that of the current television broadcasting system in the present preferred embodiment, there exist a DIF block where the section identification data is "0" and a DIF block where the section identification data is "1", namely, two kinds of section identification data 0 and 1.

According to the present preferred embodiment, the amount of data of the high-definition television broadcasting system is made to be an integer "N" multiple of the volume of data of the current television broadcasting system, and the DIF block of the high-definition television broadcasting system is divided into a plurality of sections. In this case, the transmission rate of the high-definition television broadcasting system may be preferable set to an integer "N" times as large as that of the current television broadcasting system.

The above-mentioned arrangement allows the number of blocks in each section to be identical in both of the high-definition television broadcasting system and the current television broadcasting system. Therefore, the circuit structure can be made identical in both of the high-definition television broadcasting system and the current television broadcasting system.

According to the data transmission apparatus provided with the transmission unit data constituting circuit 901a of the second preferred embodiment, the transmission can be achieved in the same transmitting manner in both of the current television broadcasting system and the high-definition television broadcasting system, thereby producing a remarkable great advantageous effect of reducing the circuit scale of the transmission apparatus.

In the present preferred embodiment, the case where data of both of the high-definition television broadcasting system and the current television broadcasting system can be transmitted is described, however, the present invention is not limited to this. The present preferred embodiment can be applied to any transmission or broadcasting systems in such a case that the amount of data of a second transmission system is set to an integer N times as large as that of the amount of data of a reference first transmission system.

Third Preferred embodiment

Figure 15:
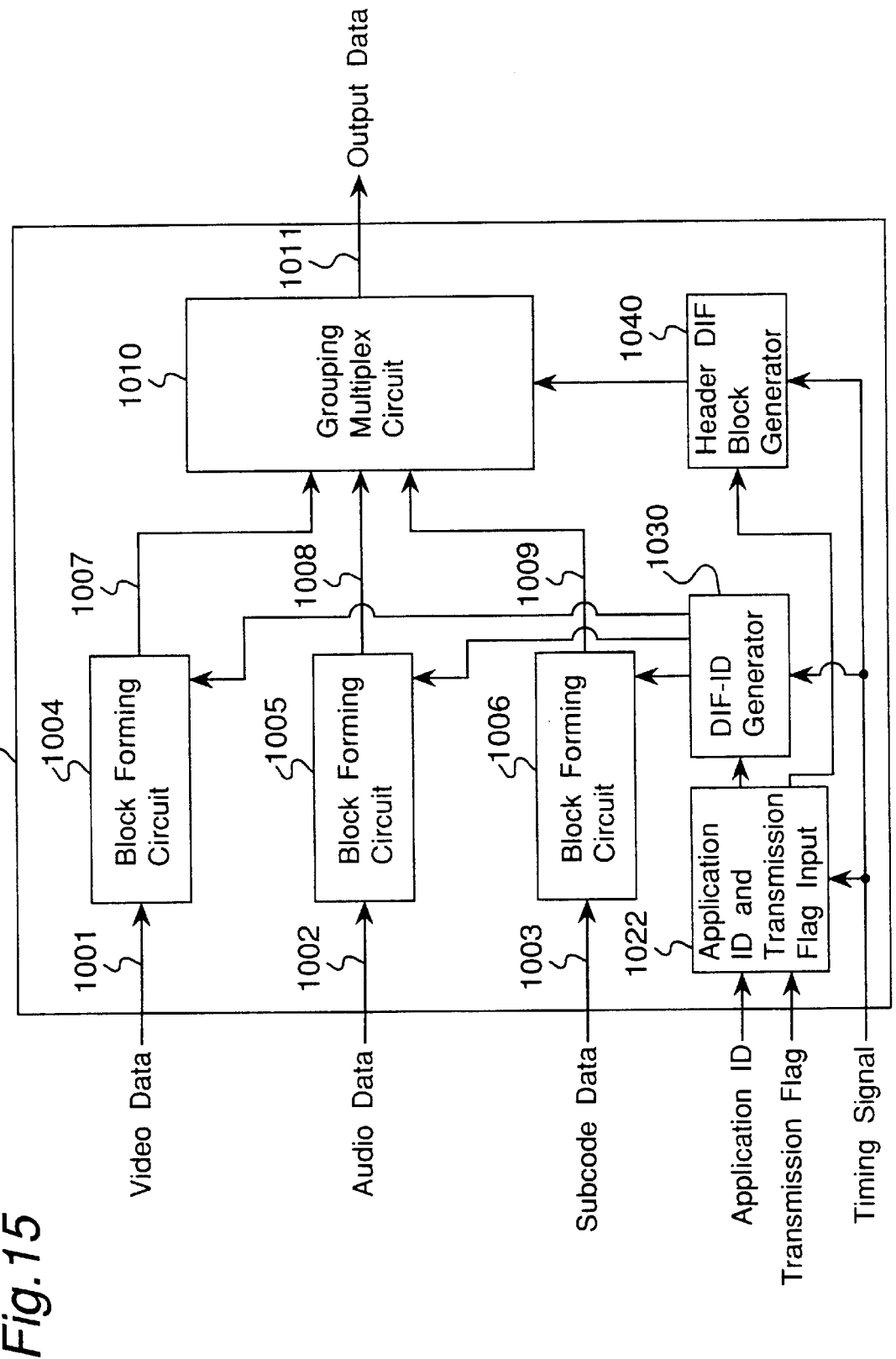
FIG. 15 is a schematic block diagram showing a transmission unit data constituting circuit 901b of a third preferred embodiment according to the present invention.

FIG. 15 shows a transmission unit data constituting circuit 901b of the third preferred embodiment according to the present invention, which may be replaced with the transmission unit data constituting circuit 901 of the first preferred embodiment shown in FIG. 10.

As is apparent from comparison between FIGS. 10 and 15, the differences between the transmission unit data constituting circuits 901 and 901b of the first and third preferred embodiments are as follows:

(a) the application ID input circuit 1020 is replaced with an application ID and transmission flag input circuit 1022.

In the present preferred embodiment, data of one or a plurality of sectors among the three sectors of the audio sector 402, the video sector 403 and the subcode sector 404 is allowed to be not transmitted. Whether the data of each sector is to be transmitted is indicated by the above-mentioned transmission flag. In other words, the transmission flag represents whether or not the DIF block for each sector is to be transmitted. In the present preferred embodiment, the transmission flag 1 represents that the DIF block is to be transmitted, while the transmission flag 0 represents that the DIF block is not to be transmitted.

The application ID and transmission flag input circuit 1020 outputs the transmission flag and the application IDs including the APT, the AP1, the AP2 and AP3 recorded onto a magnetic tape or reproduced from a magnetic tape to the DIF block structure generator 1030. The DIF block structure generator 1030 generates a DIF-ID for each sector based on the application IDs including the APT, the AP1, the AP2 and the AP3, and the transmission flag, and outputs the same to the block forming circuits 1004, 1005 and 1006.

In response to the transmission flag 1, each of the block forming circuits 1004, 1005 and 1006 forms and outputs the DIF block for each sector to the grouping multiplex circuit 1010. On the other hand, in response to the transmission flag 0, each of the block forming circuits 1004, 1005 and 1006 does not form any DIF block for this sector, and of course, does not output any DIF block. That is, no DIF block is generated for the sector determined to be not transmitted according to the indication of the transmission flag.

In the third preferred embodiment, the transmission is executed with the transmission flag arranged at every sector in the header DIF block. By decoding the header flag on the side of reception, the existence or absence of the sector transmitted subsequent to the header DIF block can be identified. Therefore, in transmitting only a specified sector, only the DIF block related to the sector can be transmitted, which can reduce the amount of data to be transmitted, thereby allowing advantageous effective use of the transmission line. In this case, the packet transceiver 903 shown in FIG. 18 may be preferably provided in order to obtain an efficient use of the transmission line.

Fourth Preferred Embodiment

Figure 16:
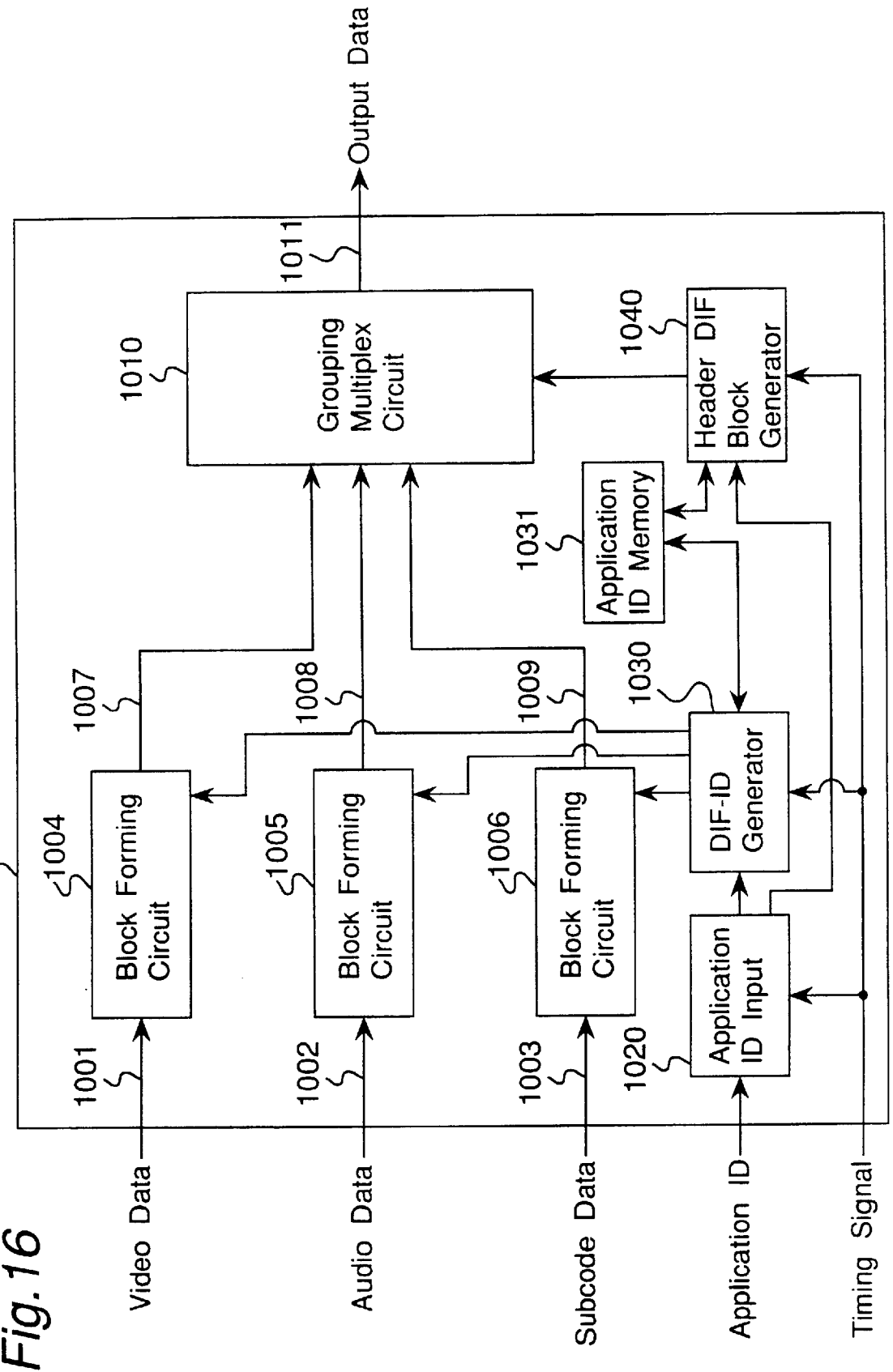
FIG. 16 is a schematic block diagram showing a transmission unit data constituting circuit 901c of a fourth preferred embodiment according to the present invention.

FIG. 16 shows a transmission unit data constituting circuit 901c of the fourth preferred embodiment, which may be replaced with the transmission unit data constituting circuit 901 of the first preferred embodiment shown in FIG. 10.

As is apparent from comparison between FIGS. 10 and 16, the differences between the transmission unit data constituting circuits 901 and 901c of the first and fourth preferred embodiments are as follows:

(a) an application ID memory 1031 for temporarily storing the application IDs is further provided so as to be connected to the DIF-ID generator 1030 and the header DIF block generator 1040.

The application IDs including the APT, the AP1, the AP2 and the AP3 for each track and each sector are stored in the application ID memory 1031. When the application IDs are indefinite due to reproduction error or the like of the recording apparatus, the block formation is executed by each of the block forming circuits 1004, 1005 and 1006 according to the structure of the DIF block immediately before the indefinite track or sector stored in the application ID memory 1030. That is, the application IDs including the APT, the AP1, the AP2 and the AP3 are generated by the DIF-ID generator 1030, and then are arranged in the header DIF block by each of the block forming circuits 1004, 1005 and 1006.

Further, if the APT can not be received, the header DIF block generator may form a header DIF block including the APT of the previous track stored in the application ID memory 1031, and then outputs the header DIF block to the grouping multiplex circuit 1010.

In this case, as a value of the indefinite application ID, a specified value representing the indefiniteness is transmitted as the application ID flag.

In the fourth preferred embodiment, when the track structure flag or any application ID representing the sector structure vanishes due to reproduction error or another factor, a DIF data block is constructed by means of the previous corresponding track structure or sector structure and then is transmitted. With the above-mentioned arrangement, even when any application IDs vanishes, data can be transmitted without any intermission or interruption. For the vanished application ID, by transmitting a specified value representing the vanishment of application ID, the vanishment of the application ID can be perceived on the receiver side.

In this case, in the receiver side, an application ID memory similar to the application ID memory 1031 may be provided.

The number and types of the sectors may be changed from those of the above-mentioned preferred embodiments. Furthermore, a part of the data on the track may be transmitted as arranged in the header DIF block. In a practical case, a structure other than that of any of those of the above-mentioned preferred embodiments or a structure implemented by software may be adopted. Also a structure achieved by combining the second, third and fourth preferred embodiments may be adopted.

By transmitting the application IDs in the header DIF block according to the second, third and fourth preferred embodiments, the data format of the DIF block subsequent to the header DIF block can be identified. Therefore, no matter how the recording format on the magnetic tape is changed, the digital interface format can be changed to a data format appropriate for the recording format according to the present preferred embodiments of the present invention.

Furthermore, the transmission flag in the header DIF block enables indication of not transmitting a sector every sector. With the above-mentioned arrangement, when only specified sectors are to be transmitted, the amount of data to be transmitted can be remarkably reduced. This allows the transmission band of the digital interface to be used effectively when a plurality of apparatuses are simultaneously communicating with each other.

The data transmission apparatus according to the present preferred embodiment of the present invention as described above can deal with a various kinds of data transmission patterns in a simple manner, thereby producing a remarkably great advantageous practical effect.

Although the present invention has been fully described by way of example with reference to the accompanying drawings, it is to be noted here that various changes and modifications will be apparent to those skilled in the art. Therefore, unless otherwise such changes and modifications depart from the scope of the present invention as defined by the appended claims, they should be construed as included therein.

What is claimed is:

1. The data transmission apparatus for transmitting inputted digital video data and digital audio data together with inputted digital auxiliary data related to said digital video data and said digital audio data, said auxiliary data being transmitted a plurality of times in one frame, comprising:

at least one data extracting means for extracting said inputted digital auxiliary data from input data including said digital video data, said digital audio data and said digital auxiliary data;

at least one majority means for counting the respective numbers of the digital auxiliary data having the same contents among a plurality of inputted digital auxiliary data, and selecting and outputting the auxiliary data of the greatest counted number in one frame; and switching means for switching said input data and said auxiliary data of the greatest counted number in one frame outputted from said majority means, wherein said input data ioncluding said digital video data, said audio data and said digital auxiliary data, so as to output and transmit said digital video data, said digital audio data and said digital auxiliary data, together with said auxiliary data of the greatest counted number in one frame outputted from said majority means, by replacing said auxiliary data included in said input data, with said auxiliary data of the greatest counted number in one frame outputted from said majority means.

2. The data transmission apparatus as claimed in claim 1, wherein said majority means counts the respective numbers of the digital auxiliary data having the same contents related to said audio data, every channel of said audio data, among a plurality of inputted digital auxiliary data related to said audio data, and selects and outputs the auxiliary data of the greatest counted number in one frame which is related to said audio data.

3. The method for transmitting inputted digital video data and digital audio data together with inputted digital auxiliary data to related to said digital video data and said digital audio data, said auxiliary data being transmitted a plurality of times in one frame, including the following steps of:

extracting said inputted digital auxiliary data from input data including said digital video data, said digital audio data and said digital auxiliary data;

counting the respective numbers of the digital auxiliary data having the same contents among a plurality of inputted digital auxiliary data, and selecting and outputting the auxiliary data of the greatest counted number in one frame; and switching said input data and said outputted auxiliary data of the greatest counted number in one frame, wherein said input data including said digital video data, said audio data and said digital auxiliary data, so as to output and transmit said digital video data, said digital audio data and said digital auxiliary data, together with said outputted auxiliary data of the greatest counted number in one frame, by replacing said auxiliary data included in said input data, with said outputted auxiliary data of the greatest counted number in one frame.

4. The method as claimed in claim 3, wherein said counting step includes a step of counting the respective numbers of the digital auxiliary data having the same contents related to said audio data, every channel of said audio data, among a plurality of inputted digital auxiliary data related to said audio data, and selecting and outputting the auxiliary data of the greatest counted number in one frame which is related to said audio data.

5. The data transmission apparatus for transmitting inputted digital video data and digital data together with inputted digital auxiliary data to related to said digital video data and said digital audio data, said auxiliary data being transmitted a plurality of times in one frame, comprising;

at least one data extracting means for extracting said inputted digital auxiliary data from input data including said digital video data, said digital audio data and said digital auxiliary data;

at least one unifying means for the contents of the pack to the pack presumed to be the most accurate in one frame; and switching means for switching said input data and said auxiliary data presumed to be the most accurate in one frame outputted from said unifying means, wherein said input data including said digital video data, said audio data and a said digital auxiliary data, so as to output and transmit said digital video data, said digital audio data and said digital auxiliary data, together with said auxiliary data presumed to be the most accurate in one frame outputted from said unifying means, by replacing said auxiliary data included in said input data, with said auxiliary data presumed to be the most accurate in one frame outputted from said unifying means.

6. The method for transmitting inputted digital video data and digital audio data together with inputted digital auxiliary data to related to said digital video data and said digital audio data, said auxiliary data being transmitted a plurality of times in one frame, including the following steps of;

extracting said inputted digital auxiliary data from input data including said digital video data, said digital audio data and said digital auxiliary data;

unifying the contents of the pack to the pack presumed to be the most accurate in one frame; and switching said input data and said outputted auxiliary data presumed to be the most accurate in one frame, wherein said input data including said digital video data, said audio data and a said digital auxiliary data, so as to output and transmit said digital video data, said digital audio data and said digital auxiliary data, together with said outputted auxiliary data presumed to be the most accurate in one frame, by replacing said auxiliary data included in said input data, with said outputted auxiliary data presumed to be the most accurate in one frame.

\* \* \* \* \*

UNITED STATES PATENT AND TRADEMARK OFFICE
CERTIFICATE OF CORRECTION

PATENT NO.    : 6,421,091 B1
DATED         : July 16, 2002
INVENTOR(S)   : Yasunori Kawakami et al.

It is certified that error appears in the above-identified patent and that said Letters Patent is hereby corrected as shown below:

Drawings,
Fig. 18, in the first line of text identified with the number "903", change "Transeiver" to -- Transceiver -- as shown in the drawing below.

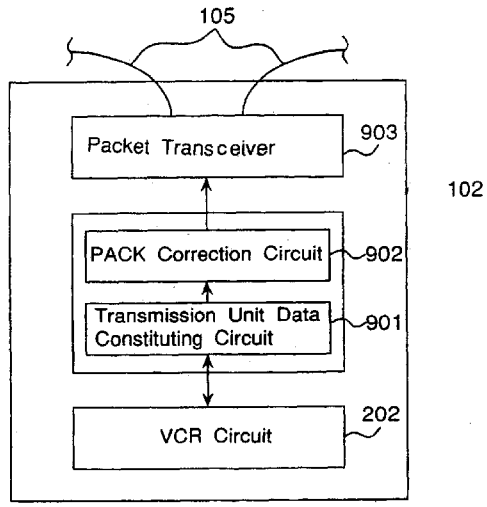

Column 17,
Line 57, change "tow" to -- two --.

Column 20,
Line 50, after "the", insert -- digital --;
Line 52, after "said" (second occurrence), insert -- digital --;
Line 55, replace "ioncluding" with -- including --;
Line 65, replace "the respective" with -- said respective --;

Column 21,
Lines 1, 3, 5, 9, 22 and 26, after "said", insert -- digital --;
Line 2, after "said", insert -- digital --; after "plurality of", insert -- said --;
Line 8, delete "to" (first occurrence);
Line 17, change "the auxiliary" to -- the digital auxiliary --;
Lines 19, 25 and 27, after "outputted", insert -- digital --;

UNITED STATES PATENT AND TRADEMARK OFFICE
CERTIFICATE OF CORRECTION

PATENT NO. : 6,421,091 B1
DATED : July 16, 2002
INVENTOR(S) : Yasunori Kawakami et al.

It is certified that error appears in the above-identified patent and that said Letters Patent is hereby corrected as shown below:

Column 21, cont'd,
Line 31, replace "the" with -- said --;
Lines 32, 34 and 37, after "said", insert -- digital --;
Line 33, after "said", insert -- digital --; after "plurality of", insert -- said --;
Line 39, after "digital" (second occurrence), insert -- audio --;
Line 40, delete "to" (first occurrence);
Line 41, after "audio data", delete "said" and insert -- wherein --;
after "auxiliary data", delete "being" and insert -- is arranged in a pack and each pack of said auxiliary data is --;

Column 22,
Line 5, after "for", insert -- unifying --;
Line 7, after "frame", insert -- by counting the respective numbers of the digital auxiliary data having the same contents among a plurality of inputted digital auxiliary data, and selecting and outputting the auxiliary data of the greatest counted number in one frame --;
Line 23, delete "to" (first occurrence);
Line 24, delete "said" and replace with -- wherein digital --; after "auxiliary data", insert -- is arranged in a pack and each pack of said auxiliary data --;
Line 30, after "frame", insert -- by counting the respective numbers of the digital auxiliary data having the same contents among a plurality of inputted digital auxiliary data, and selecting and outputting the auxiliary data of the greatest counted number in one frame --;
Lines 31, 37 and 40, after "outputted", insert -- digital --;
Line 34, change "said audio data" to -- said digital audio data --;
Line 39, before "auxiliary", insert -- digital --.

Signed and Sealed this

First Day of April, 2003

JAMES E. ROGAN
*Director of the United States Patent and Trademark Office*